United States Patent
Ruvalcaba et al.

(10) Patent No.: US 11,438,756 B2
(45) Date of Patent: Sep. 6, 2022

(54) MODEM-ASSISTED NETWORK ATTACH PROCEDURE WITHOUT DEFAULT SIM PROFILE

(71) Applicant: QUALCOMM Incorporated, San Diego, CA (US)

(72) Inventors: Jose Alfredo Ruvalcaba, Poway, CA (US); Arvind Vardarajan Santhanam, San Diego, CA (US); Kiran Kumar Vemareddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/721,685

(22) Filed: Dec. 19, 2019

(65) Prior Publication Data

US 2020/0204982 A1 Jun. 25, 2020

Related U.S. Application Data

(60) Provisional application No. 62/782,344, filed on Dec. 19, 2018.

(51) Int. Cl.
*H04W 8/18* (2009.01)
*H04W 60/04* (2009.01)
(Continued)

(52) U.S. Cl.
CPC ............ *H04W 8/183* (2013.01); *H04W 8/08* (2013.01); *H04W 8/24* (2013.01); *H04W 60/04* (2013.01); *H04W 76/11* (2018.02)

(58) Field of Classification Search
CPC ....... H04W 8/183; H04W 76/11; H04W 8/08; H04W 8/24; H04W 60/04
(Continued)

(56) References Cited

U.S. PATENT DOCUMENTS 8,195,235 B2 * 6/2012 Montes ................... H04W 8/18
455/558
8,718,710 B2 * 5/2014 Billman ................ H04W 12/35
455/558

(Continued)

FOREIGN PATENT DOCUMENTS

EP 2975870 A1 1/2016
EP 3337205 A1 6/2018

OTHER PUBLICATIONS

International Search Report and Written Opinion—PCT/US2019/067654—ISA/EPO—dated Apr. 14, 2020.

*Primary Examiner* — Nghi H Ly
(74) *Attorney, Agent, or Firm* — Qualcomm Incorporated

(57) ABSTRACT

Methods, systems, and devices for wireless communications are described. A method may include identifying an absence of a subscriber identity module (SIM) profile (e.g., in response to powering on a communication component). The method may further include determining a provider-specific configuration for communications with a wireless network and generating a set of SIM configuration parameters for a registration procedure with the wireless network based on identifying the absence of the SIM profile and the provider-specific configuration. The method may further include performing a registration procedure with the wireless network using the set of SIM configuration parameters.

28 Claims, 14 Drawing Sheets

(51) Int. Cl.
*H04W 8/08* (2009.01)
*H04W 76/11* (2018.01)
*H04W 8/24* (2009.01)

(58) Field of Classification Search
USPC .............. 370/329, 328, 338, 341, 345, 350; 455/558
See application file for complete search history.

(56) References Cited

U.S. PATENT DOCUMENTS

| | | | |
|---|---|---|---|
| 10,038,667 B2 * | 7/2018 | Taneja | ................ H04W 12/06 |
| 2013/0157673 A1 | 6/2013 | Brusilovsky | |
| 2014/0335856 A1 | 11/2014 | Marshall et al. | |

* cited by examiner

MODEM-ASSISTED NETWORK ATTACH PROCEDURE WITHOUT DEFAULT SIM PROFILE

CROSS REFERENCE

The present Application for Patent claims the benefit of U.S. Provisional Patent Application No. 62/782,344 by RUVALCABA et al., entitled "MODEM-ASSISTED NETWORK ATTACH PROCEDURE WITHOUT DEFAULT SIM PROFILE," filed Dec. 19, 2018, assigned to the assignee hereof, and expressly incorporated by reference in its entirety.

BACKGROUND

The following relates generally to wireless communications and more specifically to modem-assisted network attach procedure without a default subscriber identity module (SIM) profile.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform spread orthogonal frequency-division multiplexing (DFT-s-OFDM). A wireless multiple-access communications system may include a number of base stations or network access nodes, each simultaneously supporting communication for multiple communications devices, which may be otherwise known as user equipment (UE).

In some cases, a UE may include a SIM. The SIM may be an entity or component of the UE that contains identity information which uniquely identifies a subscriber to a particular wireless service of a system or network operator. In some cases, the UE may be provided with a SIM for connecting the UE with a wireless network where the SIM does not include a SIM profile. Accordingly, a procedure may be defined with which the UE may connect to the wireless network despite not having been provided with a SIM profile.

SUMMARY

The described techniques relate to improved methods, systems, devices, and apparatuses that support modem-assisted network attach procedure without a default subscriber identity module (SIM) profile. In some examples, a user equipment (UE) identify an absence of a SIM profile (e.g., in response to powering on a communication component). The UE may determine a provider-specific configuration for communications with a wireless network and may generate a set of SIM configuration parameters for a registration procedure with the wireless network based on identifying the absence of the SIM profile and the provider-specific configuration. The UE may then perform a registration procedure with the wireless network using the set of SIM configuration parameters.

A method of wireless communications is described. The method may include powering on a communication component of a wireless device, identifying an absence of a SIM profile for communications with a wireless network, determining a provider-specific configuration for communications with the wireless network, generating a set of SIM configuration parameters for a registration procedure with the wireless network based on identifying the absence of the SIM profile and the provider-specific configuration, and performing the registration procedure with the wireless network using the set of SIM configuration parameters.

An apparatus for wireless communications is described. The apparatus may include a processor, memory in electronic communication with the processor, and instructions stored in the memory. The instructions may be executable by the processor to cause the apparatus to power on a communication component of a wireless device, identify an absence of a SIM profile for communications with a wireless network, determine a provider-specific configuration for communications with the wireless network, generate a set of SIM configuration parameters for a registration procedure with the wireless network based on identifying the absence of the SIM profile and the provider-specific configuration, and perform the registration procedure with the wireless network using the set of SIM configuration parameters.

Another apparatus for wireless communications is described. The apparatus may include means for powering on a communication component of a wireless device, identifying an absence of a SIM profile for communications with a wireless network, determining a provider-specific configuration for communications with the wireless network, generating a set of SIM configuration parameters for a registration procedure with the wireless network based on identifying the absence of the SIM profile and the provider-specific configuration, and performing the registration procedure with the wireless network using the set of SIM configuration parameters.

A non-transitory computer-readable medium storing code for wireless communications is described. The code may include instructions executable by a processor to power on a communication component of a wireless device, identify an absence of a SIM profile for communications with a wireless network, determine a provider-specific configuration for communications with the wireless network, generate a set of SIM configuration parameters for a registration procedure with the wireless network based on identifying the absence of the SIM profile and the provider-specific configuration, and perform the registration procedure with the wireless network using the set of SIM configuration parameters.

Some examples of the method, apparatuses, and non-transitory computer-readable medium described herein may further include operations, features, means, or instructions for locating a data file stored in memory of the wireless device containing the set of SIM configuration parameters, where the set of SIM configuration parameters may be generated based on the data file. Some examples of the method, apparatuses, and non-transitory computer-readable medium described herein may further include operations, features, means, or instructions for caching the set of SIM configuration parameters in a buffer of the wireless device, where the registration procedure may be performed using the cached set of SIM configuration parameters.

Some examples of the method, apparatuses, and non-transitory computer-readable medium described herein may further include operations, features, means, or instructions for receiving signaling including an indication of one or more parameters of the provider-specific configuration, where the provider-specific configuration may be determined based on the received indication.

Some examples of the method, apparatuses, and non-transitory computer-readable medium described herein may further include operations, features, means, or instructions for determining the provider-specific configuration based on an indication of one or more parameters of the provider-specific configuration preconfigured for the wireless device. In some examples of the method, apparatuses, and non-transitory computer-readable medium described herein, the indication of the one or more parameters of the provider-specific configuration preconfigured for the wireless device may be based on one or more of master files, dedicated files, and elementary files preconfigured for the wireless device. In some examples of the method, apparatuses, and non-transitory computer-readable medium described herein, the indication of the one or more parameters of the provider-specific configuration preconfigured for the wireless device may be based on an integrated circuit card identifier for the wireless device.

Some examples of the method, apparatuses, and non-transitory computer-readable medium described herein may further include operations, features, means, or instructions for generating a globally unique temporary identifier based on the SIM configuration parameters, where the registration procedure may be performed using the globally unique temporary identifier. In some examples of the method, apparatuses, and non-transitory computer-readable medium described herein, the globally unique temporary identifier includes a mobility management entity identifier and a temporary subscriber identifier.

In some examples of the method, apparatuses, and non-transitory computer-readable medium described herein, the set of SIM configuration parameters includes a subscriber identifier, administrative data, an access control class, location area information, a location update status, a temporary subscriber identity, a globally unique temporary identifier, a last visited network and tracking area, an attach/detach completion status, a hash function to be used for a security context, a SIM service table, or a combination thereof.

In some examples of the method, apparatuses, and non-transitory computer-readable medium described herein, the registration procedure may be performed according to a set of service capabilities, the set of service capabilities based on the set of SIM configuration parameters.

In some examples of the method, apparatuses, and non-transitory computer-readable medium described herein, the wireless device may be configured with a software capability to identify, upon powering on the communication component, the absence of the SIM profile for communications with the wireless network, the identifying based on the capability.

In some examples of the method, apparatuses, and non-transitory computer-readable medium described herein, powering on the communication component of the wireless device may include operations, features, means, or instructions for powering on a radio component for communications using a first type of radio access technologies.

DETAILED DESCRIPTION

Figure 1:
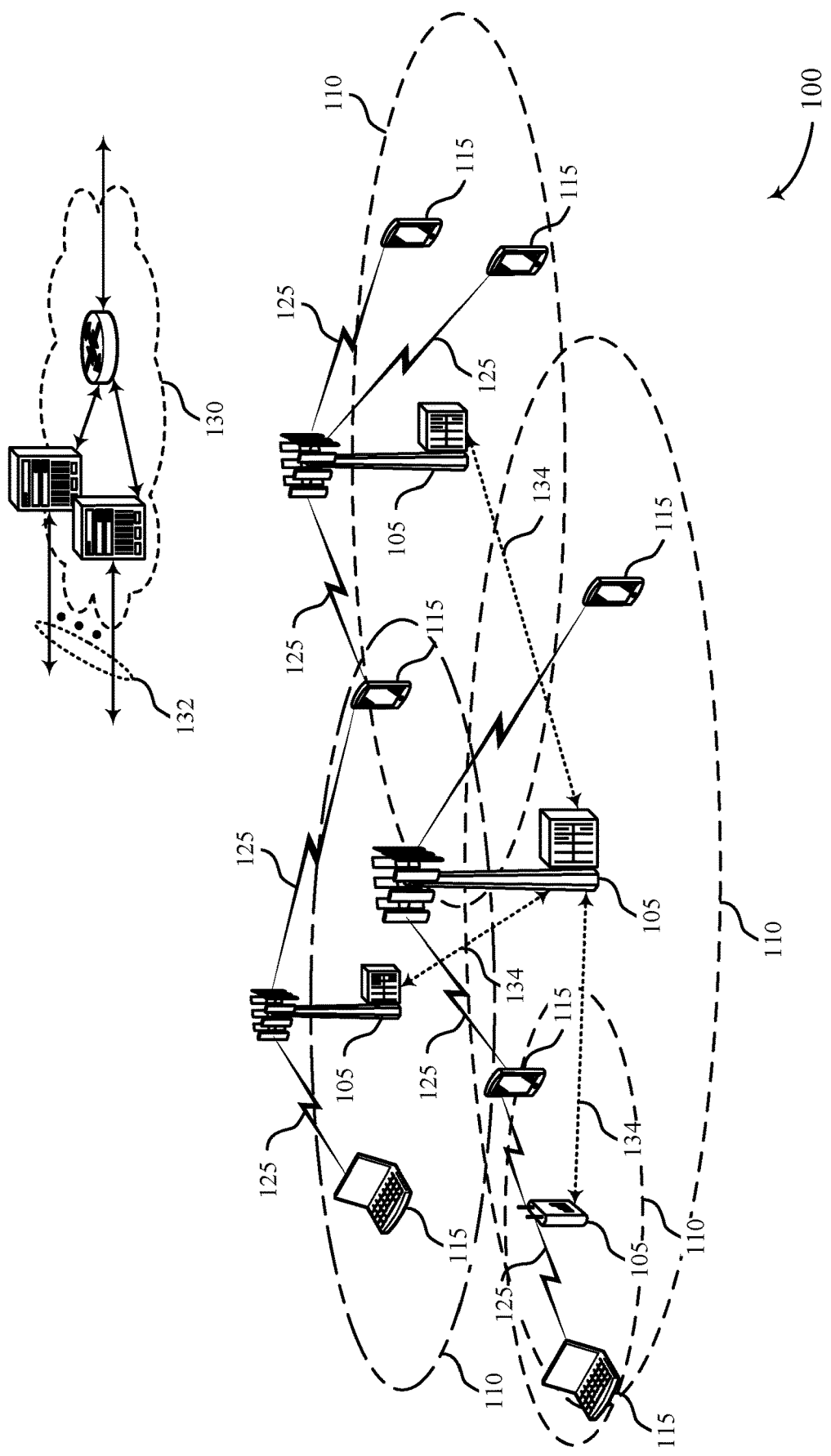
FIG. 1 illustrates an example of a wireless communications system that supports a modem-assisted network attach procedure without a default subscriber identity module (SIM) profile in accordance with aspects of the present disclosure.

The described techniques relate to improved methods, systems, devices, or apparatuses that support techniques for a modem-assisted network attach procedure without a default subscriber identity module (SIM) profile in accordance with aspects of the present disclosure.

A user equipment (UE) may employ techniques to communicate with other devices of a wireless network. In some cases, the UE may be provided with a SIM (which may alternatively, in some cases, be referred to as a SIM card) for connecting the UE with the wireless network where the SIM does not include a SIM profile. To access the wireless network, the UE may use a configured procedure to acquire the wireless network and download a SIM profile that the UE may use to access the wireless network, for example, via an attach procedure.

The techniques described herein provide an access procedure in which the UE may use a network key to attach to the wireless network via the base station. Once the network detects that the UE has attached to the network (e.g., via one or more network devices), the network may notify a remote provisioning platform (e.g., a remote SIM provisioning platform) to correspondingly notify the SIM of the UE that a provider profile is available. Based on this notification that the provider profile is available, the UE may reconnect with the wireless network and download the provider profile using connectivity provided by way of the network key. The SIM of the UE may then switch to using the provider profile to communicate with the wireless network.

According to the techniques described herein, procedures are provided by which the UE may access the wireless network using a network key, rather than, for example, a bootstrap profile, or other techniques that may involve the use of additional hardware, circuit board complexity, or signaling complexity. That is, in some cases, the SIM may be a virtual SIM (or eSIM) which may implement the functions of a normal SIM using, for example, a software configuration. As compared to a procedure using the network key for the attach procedure, a bootstrap profile, for example, may include particular credentials that may be used to generically access wireless networks of multiple providers, whereas a network key may be particularly configured to access a particular provider. Accordingly, the network key may reduce a complexity to access the wireless network, for example, relative to using the bootstrap profile. In some cases, the bootstrap profile may also increase a manufacturing cost of the SIM. For example, a bootstrap profile may be implemented via an additional structural component of the SIM. A network key, on the other hand, may not include additional hardware or structural components to implement. Thus, an access procedure using the network key may reduce a complexity and manufacturing cost of the SIM and thus of the UE.

Aspects of the disclosure are initially described in the context of wireless communications systems. Aspects of the disclosure are also described in the context of process flows. Aspects of the disclosure are further illustrated by and described with reference to apparatus diagrams, system diagrams, and flowcharts that relate to modem-assisted network attach procedure without a default SIM profile.

FIG. 1 illustrates an example of a wireless communications system 100 that supports a modem-assisted network attach procedure without a default SIM profile in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communications entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform spread OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Each UE 115 may contain one or more SIMs, which may alternative be referred to as SIM cards. A SIM may be an entity or component of the UE 115 that contains an International Mobile Subscriber Identity (IMSI), which may uniquely identify a subscriber to a particular wireless service of a system operator. Without a valid IMSI, service may not be accessible to the UE 115. The SIM may provide a means to authenticate a user of the UE 115. The SIM may also store other subscriber-related information or applications such as text messages and phone book contacts. The UE 115 may have a subscription to access a particular network or communications system, and the subscription may be associated with access credentials, user information, billing or charging information, usage information, and the like for the user of the UE 115. In some cases, the SIM may be associated with and/or include information, access credentials, and the like to access the communications system. Examples of SIMs include a Universal Subscriber Identity Module (USIM) provided for in standards of the "3rd Generation Partnership Project" (3GPP) LTE standard and/or a Removable User Identity Module (R-UIM) provided for in standards of the "3rd Generation Partnership Project 2" (3GPP2). A Universal Integrated Circuit Card (UICC) may be another term to the SIM may be referred.

The SIM may be an integrated circuit that securely stores the IMSI and the related key used to identify and authenticate the UE 115. The SIM may also contain a unique serial number (e.g., an integrated circuit card ID (ICCID)), security authentication and ciphering information, temporary information related to the local network, a list of the services, a personal identification number (PIN), and a personal unblocking code (PUK) for PIN unlocking. In some cases, a SIM may also refer to a virtual SIM, which may be implemented as a remote SIM profile loaded in an application on the UE 115, and which may enable normal SIM functions on the UE 115.

In some cases, a remote server, such as a subscription manager or other network entity, may provide a SIM profile to a UE 115 that is to begin a connection procedure with the wireless communications system 100. The SIM profile may be derived from information that a mobile network operator (MNO) provides to the remote server. The remote server may then store the SIM profile. In some cases, the SIM profile may be downloaded by the UE 115 and saved on a SIM or virtual SIM of the UE 115. The UE 115 may subsequently enable the SIM profile to communicate using the wireless communications system 100. In various examples, the remote server may authenticate the UE 115 to confirm that the UE 115 is authorized to connect to the network operator by any of a variety of existing authentication processes.

The techniques described herein provide an access procedure in which a UE 115 may use a network key to attach to a wireless network, for example, in situations in which a SIM of the UE 115 does not include a preconfigured SIM profile. For example, the SIM of the UE 115 may use the network key to attach to the wireless network via an MME. The UE may then establish a communication link with the wireless network. Once the MME detects that the UE 115 has attached to the network, the MME may notify a remote provisioning platform (e.g., a remote SIM provisioning platform) to notify the SIM of the UE 115 that a provider profile for the UE 115 is available. Based on the notification that the provider profile is available, the UE 115 may connect with the remote provisioning platform and download the provider profile using connectivity provided by way of the network key. The SIM of the UE 115 may then switch to using the provider profile to communicate with the wireless network.

Figure 2:
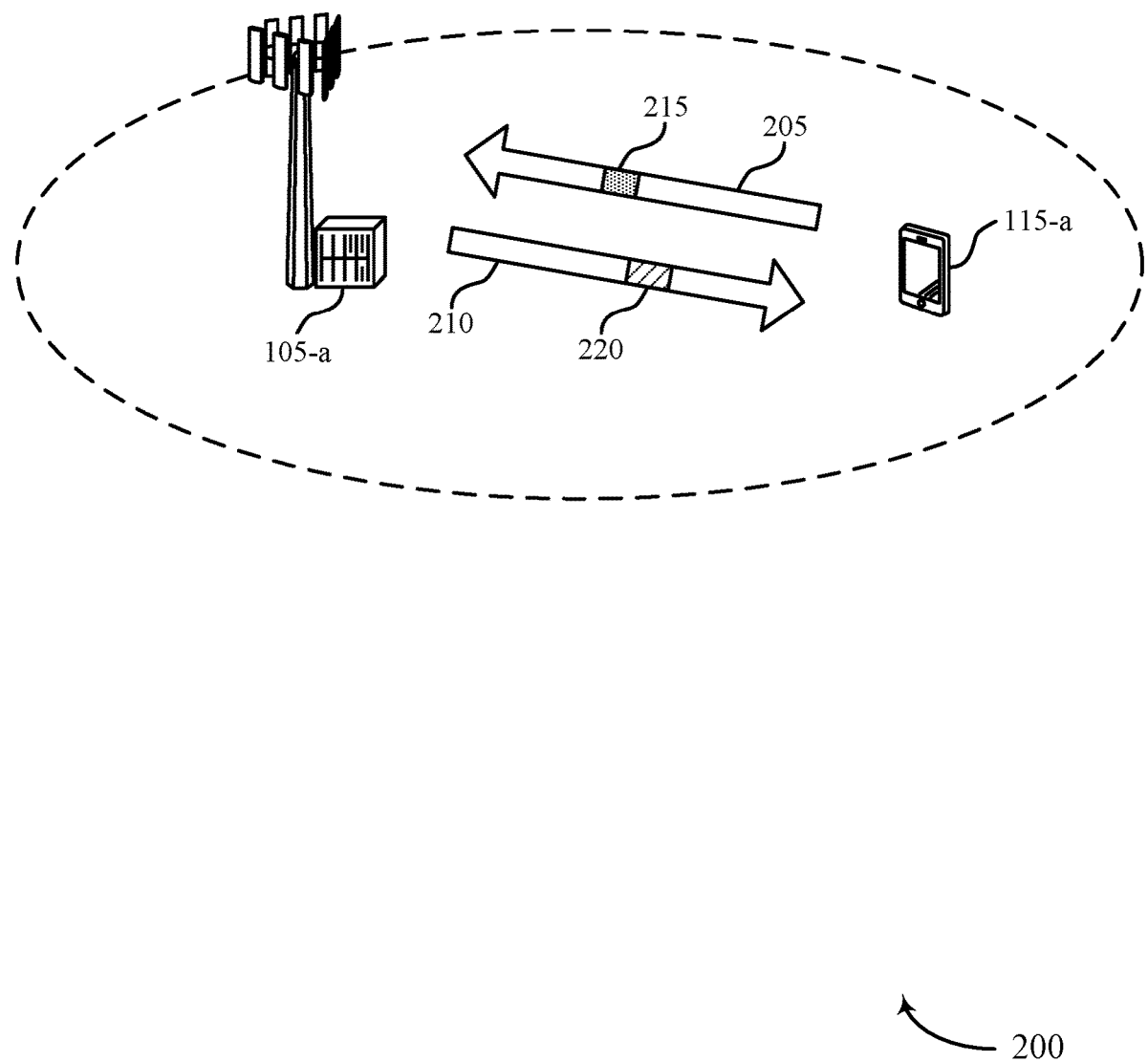
FIG. 2 illustrates an example of a wireless communications system that supports a modem-assisted network attach procedure without a default SIM profile in accordance with aspects of the present disclosure.

FIG. 2 illustrates an example of a wireless communications system 200 that supports a modem-assisted network attach procedure without a default SIM profile in accordance with aspects of the present disclosure. In some examples, the wireless communications system 200 may implement aspects of the wireless communications system 100 as described with reference to FIG. 1. The wireless communications system 200 includes a base station 105-a and a UE 115-a, which may be examples of the corresponding devices as described with reference to FIG. 1. In some cases, the base station 105-a may include various functions and entities (not shown), such as an MME and a remote provisioning platform. Communications over the wireless communications system 200 may include various uplink transmissions 205 from the UE 115-a to the base station 105-a and downlink transmissions 210 from the base station 105-a to the UE 115-a.

The UE 115-a may employ techniques to communicate with other devices of the wireless communications system 200. In some cases, the UE 115-a may be provided with a SIM for connecting the UE with a wireless network (e.g., the wireless communications system 200) where the SIM does not include a SIM profile. To access the wireless network (e.g., via the base station 105-a), the UE 115-a may use a configured procedure to acquire the wireless network and download a SIM profile that the UE 115-*a* may use to access the wireless network, for example, via an attach procedure.

According to access procedures for some wireless communications systems, the UE 115-*a* may use a bootstrap profile to access the wireless network. For example, a SIM of the UE 115-*a* may use the bootstrap profile to attach to the wireless network via the base station 105-*a* and accordingly establish a communication link with the wireless network. Once the wireless network detects that the UE 115-*a* has attached to the wireless network, the wireless network may notify a remote provisioning platform to correspondingly notify the SIM of the UE 115-*a* that a provider profile 220 is available. Based on this notification that the provider profile 220 is available, the UE 115-*a* may reconnect with the wireless network and download the provider profile 220 using connectivity provided by way of the bootstrap profile. The SIM of the UE 115-*a* may then switch from using the bootstrap profile to using the provider profile 220 to communicate with the wireless network.

The techniques described herein may provide an access procedure in which the UE 115-*a* may not use a bootstrap profile to access the wireless network. For example, a SIM of the UE 115-*a* may use a network key 215 to attach to the wireless network via the base station 105-*a*. Once the network detects that the UE 115-*a* has attached to the network, the network may notify a remote provisioning platform (e.g., a remote SIM provisioning platform) to correspondingly notify the SIM of the UE 115-*a* that a provider profile 220 (e.g., a provider-specific configuration) is available. Based on this notification, the UE 115-*a* may reconnect with the wireless network and download the provider profile 220 using connectivity provided by way of the network key 215. The SIM of the UE 115-*a* may then switch to using the provider profile 220 to communicate with the wireless network. For example, the UE 115-*a* may generate and/or load SIM configuration data into a cache of the SIM to be used to communicate with the wireless network. The SIM configuration data may include, for example, one or more of: a subscriber identifier, administrative data, an access control class, location area information, a location update status, a temporary subscriber identity, a globally unique temporary identifier, a last visited network and tracking area, an attach/detach completion status, a hash function to be used for a security context, a SIM service table, or a combination thereof. The SIM of the UE 115-*a* may then use the SIM configuration data to communicate with the wireless network.

According to the techniques described herein, procedures are provided by which the UE 115-*a* may access the wireless network using a network key 215, rather than, for example, a bootstrap profile. In some cases, a bootstrap profile may include particular credentials that may be used to generically access wireless networks of multiple providers, whereas a network key 215 may be particularly configured to access a particular provider. Accordingly, using the network key 215 may reduce a complexity to access the wireless network relative to using a bootstrap profile. In some cases, the bootstrap profile may also increase a manufacturing cost of the SIM card. For example, a bootstrap profile may be implemented as an additional structural component of the SIM. A network key 215, on the other hand, may not be implemented using additional hardware or additional structural components. Thus, an access procedure using the network key may reduce a complexity and manufacturing cost of the SIM and thus of the UE.

Figure 3:
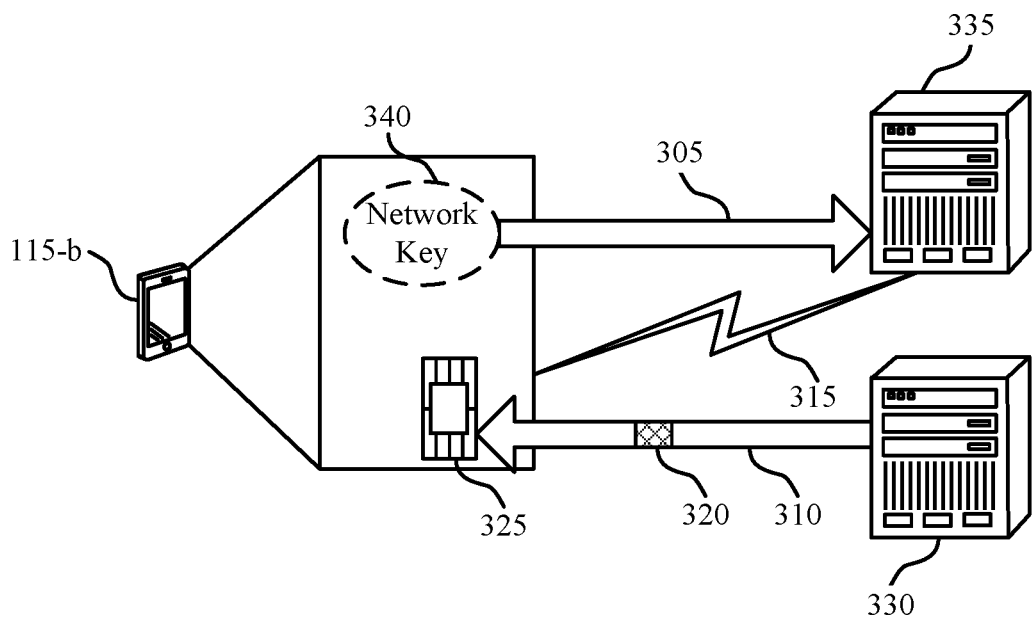
FIG. 3 illustrates an example of a wireless communications system that supports a modem-assisted network attach procedure without a default SIM profile in accordance with aspects of the present disclosure.

FIG. 3 illustrates an example of a wireless communications system 300 that supports a modem-assisted network attach procedure without a default SIM profile in accordance with aspects of the present disclosure. In some examples, the wireless communications system 300 may implement aspects of the wireless communications system 100 as described with reference to FIG. 1 and the wireless communications system 200 as described with reference to FIG. 2. The wireless communications system 300 may include a UE 115-*b*, which may be an example of the UEs 115 as described with reference to FIGS. 1 and 2. The wireless communications system 300 may also include a remote provisioning platform 330 (e.g., a remote SIM provisioning platform) and an MME 335. In some cases, the remote provisioning platform 330 and the MME 335 may be functions of and collocated at a base station, as described with reference to FIGS. 1 and 2, and in other cases the remote provisioning platform 330 and the MME 335 may be located at different physical locations and/or at different physical entities. The wireless communications system 300 may include various uplink transmissions 305 from the UE 115-*b* to different network functions, such as the remote provisioning platform 330 and the MME 335, and downlink transmissions 310 from the network functions to the UE 115-*b*.

The techniques described herein provide an access procedure in which the UE 115-*b* may use a network key 340 to attach to a wireless network. For example, an eSIM 325 of the UE 115-*b* (or, alternatively, other types of SIMs, e.g., a USIM) may use the network key 340 to attach to the wireless network via the MME 335. The UE 115-*b* may then establish a communication link 315 with the wireless network. Once the MME 335 detects that the UE 115-*b* has attached to the network, the MME 335 may notify the remote provisioning platform 330 to correspondingly notify the eSIM 325 of the UE 115-*b* that a provider profile 320 for the UE 115-*b* is available. Based on this notification that the provider profile 320 is available for the UE 115-*b*, the UE 115-*b* may connect with the remote provisioning platform 330 and download the provider profile 320 using connectivity provided by way of the network key 340. The eSIM 325 of the UE 115-*b* may then switch to using the provider profile 320 to communicate with the wireless network.

In some cases, the UE 115-*b* may have a set of capabilities that may, individually or in some combinations, facilitate the UE 115-*b* to perform the attach procedure as described herein. For example, the UE 115-*b* may have a capability to power on with an eSIM 325 including a master file, such as an eSIM 325 that does not include an associated SIM profile. In some cases, the eSIM 325 of the UE 115-*a* may include an integrated circuit card identifier (e.g., an ICCID). The UE 115-*a* may use the ICCID as a way to identify a set of information (e.g., one or more network parameters) that the UE 115—may use to access the wireless network.

In some cases, the UE 115-*b* may have a capability to generate a network key 340. For example, after the UE 115-*b* has attached to and authenticated with a wireless network (e.g., the wireless communications system 300), the UE 115-*b* may generate a globally unique temporary identifier (e.g., a Globally Unique Temporary UE Identity (GUTI), or other operator-specific data). In some cases, the globally unique temporary identifier may be used as the network key 340. In some cases, the MME 335 may assign a particular globally unique temporary identifier to the UE 115-*b* when the UE 115-*b* attaches to the wireless network and has completed identity and authentication procedures. In some cases, the assigned globally unique temporary identifier may be particular to the MME 335, and when the UE 115-*b* connects to a new MME 335 (e.g., the new MME 335 being different from another MME with which the UE 115-*b* was previously connected), the new MME 335 may assign a new globally unique temporary identifier to the UE 115-*b*.

After having acquired the globally unique temporary identifier from the MME 335, the UE 115-*b* may store the globally unique temporary identifier in the eSIM 325 of the UE 115-*b*. The UE 115-*b* may then use the stored globally unique temporary identifier, for example, as the network key 340, to bypass one or more portions of an initialization sequence. For example, the globally unique temporary identifier may allow the UE 115-*b* to bypass an identity procedure and/or an authentication procedure (e.g., an RRC authentication procedure) of an initialization sequence. In some cases, a globally unique temporary identifier may expire after a certain time period (e.g., after 72 hours).

In some cases, the globally unique temporary identifier may include an MME identifier (e.g., a 48-bit universal Globally Unique MME Identifier (GUMMEI)) and a temporary subscriber identifier (e.g., a 32-bit M-Temporary Mobile Subscriber Identity (M-TMSI)). In some cases, the MME identifier may be defined according to one or more MMEs 335. In some cases, the MME identifier may be preloaded on the UE 115-*b* (e.g., during provision or manufacturing), and the value of the value of the MME identifier may be whitelisted for communications with each of the MMEs 335. In some cases, the MME identifier may be common across different UEs 115. Alternatively, the MME identifier may be different from one UE 115 to another UE 115. In some cases, the temporary subscriber identifier may be generated based on a UE identifier (e.g., an International Mobile Equipment Identity (IMEI)), for example, using a hash algorithm. Accordingly, the temporary subscriber identifier may be unique to each UE 115. In some cases, the globally unique temporary identifier may be based on a combination of the MME identifier and the temporary subscriber identifier.

In some cases, the eSIM 325 of the UE 115-*b* may use one or more additional parameters to access and/or communicate with other wireless devices of the wireless network, including, for example, a globally unique temporary identifier, a hash function to be used for a non-access stratum (NAS) security context, an access control class, a SIM service table, and the like. In some cases, these and other parameters may be saved in one or more stored files on the eSIM 325 of the UE 115-*b*. That is, the eSIM 325 of the UE 115-*b* may store one or more files, including various master files (MFs), elementary files (EFs), and/or dedicated files (DFs). For example, the eSIM 325 of the UE 115-*a* may store: an EF_Evolved Packet System Location Information (EF_EPSLOCI) file storing a globally unique temporary identifier, a last visited network and tracking area (e.g., a last visited registered Tracking Area Identify (TAI), and an attach/detach completion status indicating, for example, a normal or abnormal completion status (e.g., an Evolved Packet System (EPS) update status); a NAS Security ContextHash file; an EF_Access Control Class (EF_ACC) file storing a parameter to control access attempts by devices of one or more access control classes; and/or an EF_SIM Service Table (EF_SST) file indicating the services that may be allocated, and whether, if allocated, the service is activate (if, e.g., a service is not allocated or not activated in the SIM, the UE 115-*b* may not select this service). In some cases, one or more of these parameters may be provisioned as part of the network key 340 (e.g., additionally to the globally unique temporary identifier).

In some cases, the UE 115-*b* may connect to the wireless network via an Internet PDN, which may provide the UE 115-*b* access to the Internet. For example, user IP packets may be transferred through a S-GW, where the S-GW may be connected to a P-GW. The P-GW may be connected to a network operator's IP services. In some cases, the network operator's IP services may include access to one or more of the Internet, Intranet(s), an IMS, a PS Streaming Service, and the like. In other cases, the UE 115-*b* may connect to the wireless network, for example, via an IMS PDN connection, which may, for example, be routed through at least one network device for IMS services. The IMS services may include, for example, voice over LTE (VoLTE) services.

In some cases, the UE 115-*b* may have a capability to receive a short message service (SMS) transmission that may provide for data downloading via SMS point-point (PP). For example, procedures for remote SIM provisioning and/or management of M2M connections may allow for "over-the-air" provisioning of an initial operator subscription and for a subsequent change of subscription from one operator to another. In such cases, some M2M remote SIM provisioning procedures may not be modified, and an SMS message may be used to initiate a data download via SMS PP. In some cases, the UE 115-*b* may have a capability to support bearer independent protocol (BIP), that is, a mechanism at the interface between the SIM and the UE 115-*b* that provides access to the data bearers supported by the UE 115-*b*. For example, the eSIM 325 may trigger remote SIM provisioning upon receiving the SMS message used to initiate a data download via SMS PP using BIP (e.g., which may include commands such as "OPEN CHANNEL," "SEND DATA," "RECEIVE DATA," etc.), for example, using a command from the PDN such as an "OPEN CHANNEL REQUEST" command. Once the remote SIM provisioning completes, the eSIM 325 may issue signaling (e.g., indicating a "REFRESH" command) allowing the provider profile to be activated for network acquisition.

In some cases, the wireless communications system 300 may operate according to an assumption that a SIM is present for the UE 115-*b*. In some cases, the wireless communications system 300 may implement full service procedures. In some cases, "full service" may, for example, refer to a set of services that do not substantially limit the capabilities of the UE 115-*b*. Further, one or more state machines of the wireless communications system 300 may change state based on some data (e.g., administrative data). In some cases, access control information may identify the UE 115-*b* as a personal user device, and an access control configuration may limit the services of the UE 115-*b* to be personal services.

In some cases, a UE 115 operated by an emergency service provider may be company-provisioned to provide access to and/or control of both personal services and emergency services. Accordingly, if, for example, a catastrophic event were to occur, the network may permit devices with emergency services subscriptions to use the network and may not permit devices that do not have emergency services subscriptions to use the network. In some cases, the state machines of the wireless communications system 300 may communicate with the wireless network using a provider profile 320, as similarly described herein. In some cases, the UE 115-*b* may have a capability to communicate using, for example, SMS transmissions or other data transmission. In some cases, the UE 115-*b* may use full service procedures to communicate SMS transmissions or other data transmission.

In some cases, a modem at the UE 115-*b* may receive data packets from, for example, a base station and deliver the received data packets to a corresponding application hosted by the UE 115-*b* that may use the information in the received data packet. Analogously, the modem at the UE 115-*b* may facilitate transmitting data packets, for example, to a base station, in some cases, based on a particular application hosted at the UE 115-*b*. In some cases, the modem may implement full service procedures, that is, a full set of services that may not limit the capabilities of the UE 115-*b*. To implement such full service procedures (e.g., when using a globally unique temporary identifier), the modem may use a set of SIM parameters (e.g., a limited set of SIM parameters that may be less than the set of SIM parameters that may be used for other purposes, e.g., an initial attach procedure). For example, the modem may use SIM parameters included in, for example: an EF_Administrative Data (EF_AD) file including information relating to a mode of operation corresponding a type of the SIM, such as one or more of: a normal mode of operation (to be used by, e.g., public land mobile network (PLMN) subscribers), a type approval mode of operation (e.g., to allow specific use of the UE 115-*b* during type approval procedures), a cell testing mode of operation (e.g., to allow testing of a cell before commercial use of this cell), a manufacturer specific mode of operation (e.g., to allow the manufacturer of the UE 115-*b* to perform testing of the UE 115-*b*, e.g., during a maintenance phases), among other like administrative data information, an EF_Access Control Class (EF_ACC) file storing a parameter to control access attempts by devices of one or more access control classes, and other like information. Based on the information (e.g., stored in the EF_Access Control Class file), the modem may correspondingly provision different classes of devices.

Figure 4:
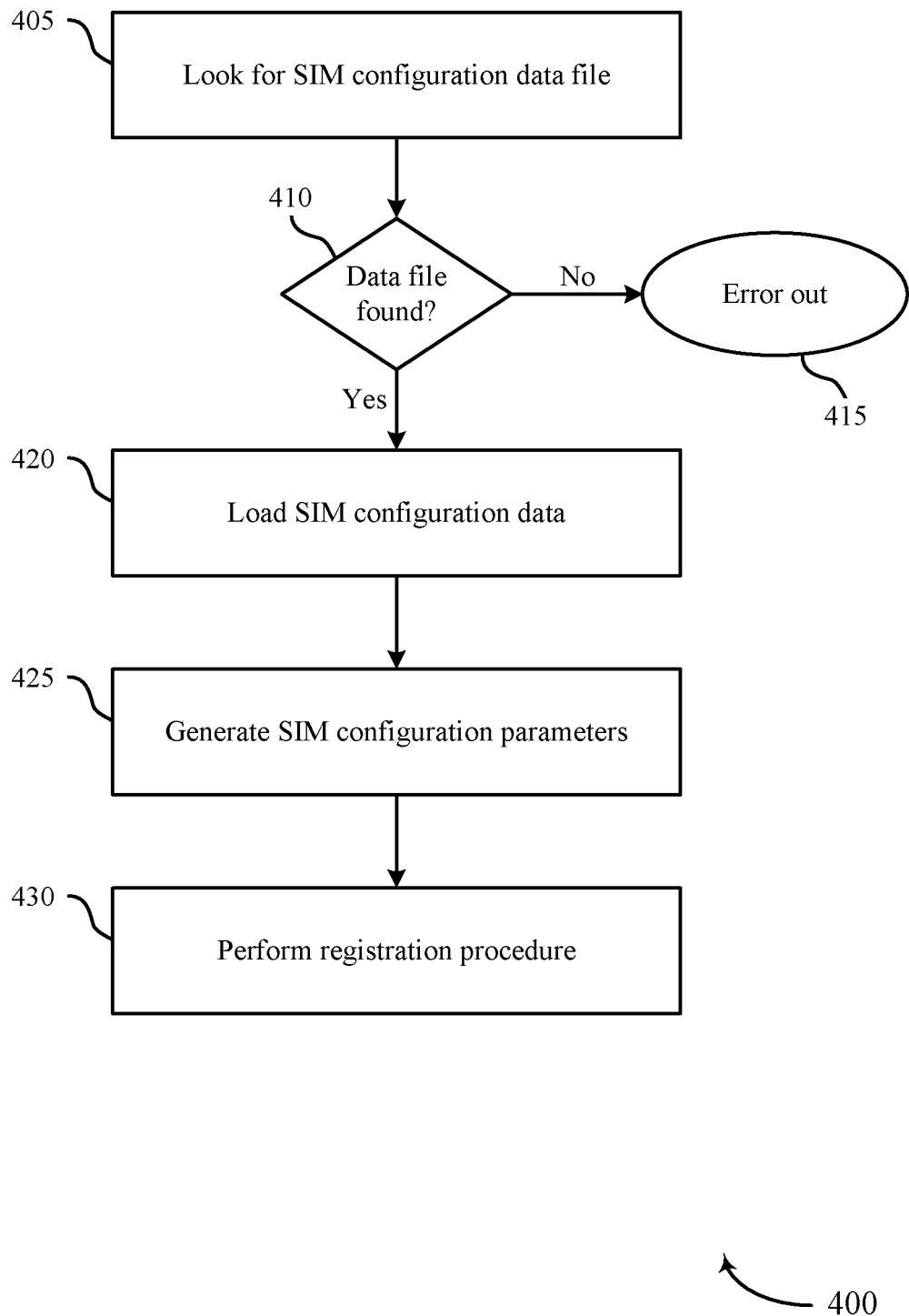
FIG. 4 illustrates an example of a process flow that supports a modem-assisted network attach procedure without a default SIM profile in accordance with aspects of the present disclosure.

FIG. 4 illustrates an example of a process flow 400 that supports a modem-assisted network attach procedure without a default SIM profile in accordance with aspects of the present disclosure. In some examples, the process flow 400 may implement aspects of the wireless communications system 100, the wireless communications system 200, and the wireless communications system 300, as described with reference to FIGS. 1, 2, and 3, respectively. The process flow 400 shows an example of an access procedure in which a UE may use a network key to attach to a wireless network.

At 405, for example, after powering on, the UE may look for a SIM configuration data file. For example, the UE may locate the data file stored in memory of the UE, where the data file may contain a set of SIM configuration parameters. In some cases, the SIM configuration data file may include a limited set of SIM parameters that, for example, parameters sufficient for limited capabilities of the UE with which the UE may perform the access procedure. For example, a SIM of the UE may not provide a preconfigured provider specific configuration.

At 410, the UE may determine whether the UE found the SIM configuration data file. In some cases, the UE may determine that the SIM configuration data file is not found. At 415, if, for example, the UE determines that the SIM configuration data file is not found at 410, the UE may acknowledge that an error has occurred. In this situation, the UE may, for example, terminate and/or restart the attach procedure.

At 420, if, for example, the UE determines that the SIM configuration data file is found at 410, the UE may load the SIM configuration data. For example, the UE may load the SIM configuration data into a SIM cache. For example, the UE may establish a communication link with the wireless network, and an MME may detect that the UE has attached to the network. The MME may notify a remote provisioning platform to correspondingly notify the SIM of the UE that a provider profile (e.g., a provider-specific configuration) for the UE is available. Based on the notification that the provider profile for the UE is available, the UE may connect with the remote provisioning platform and download the provider profile using connectivity provided by way of a network key. The UE may then generate and/or load SIM configuration data into a cache of the SIM. The SIM configuration data may include, for example, one or more: a subscriber identifier, administrative data, an access control class, location area information, a location update status, a temporary subscriber identity, a globally unique temporary identifier, a last visited network and tracking area, an attach/detach completion status, a hash function to be used for a security context, a SIM service table, (including specific parameters such as: EF_IMSI, EF_AD, EF_ACC, EF_LOCI, EF_PSLOCI, and/or EF_ESAPLOCI), and the like. The SIM of the UE may then use the SIM configuration data to communicate with the wireless network.

At 425, the UE may generate SIM configuration parameters for a registration procedure to attach to the wireless network. In some cases, the UE may generate a globally unique temporary identifier (e.g., a GUTI). In some cases, the globally unique temporary identifier may include an MME identifier (e.g., a 48-bit universal GUMMEI) and a temporary subscriber identifier (e.g., a 32-bit M-TMSI). In some cases, the globally unique temporary identifier may be based on a combination of the MME identifier and the temporary subscriber identifier.

At 430, the UE may then perform the registration procedure, for example, using the SIM configuration parameters generated at 425. For example, the UE may initiate or reinitiate modem procedures to attach to the wireless network (e.g., using the globally unique temporary identifier).

Figure 5:
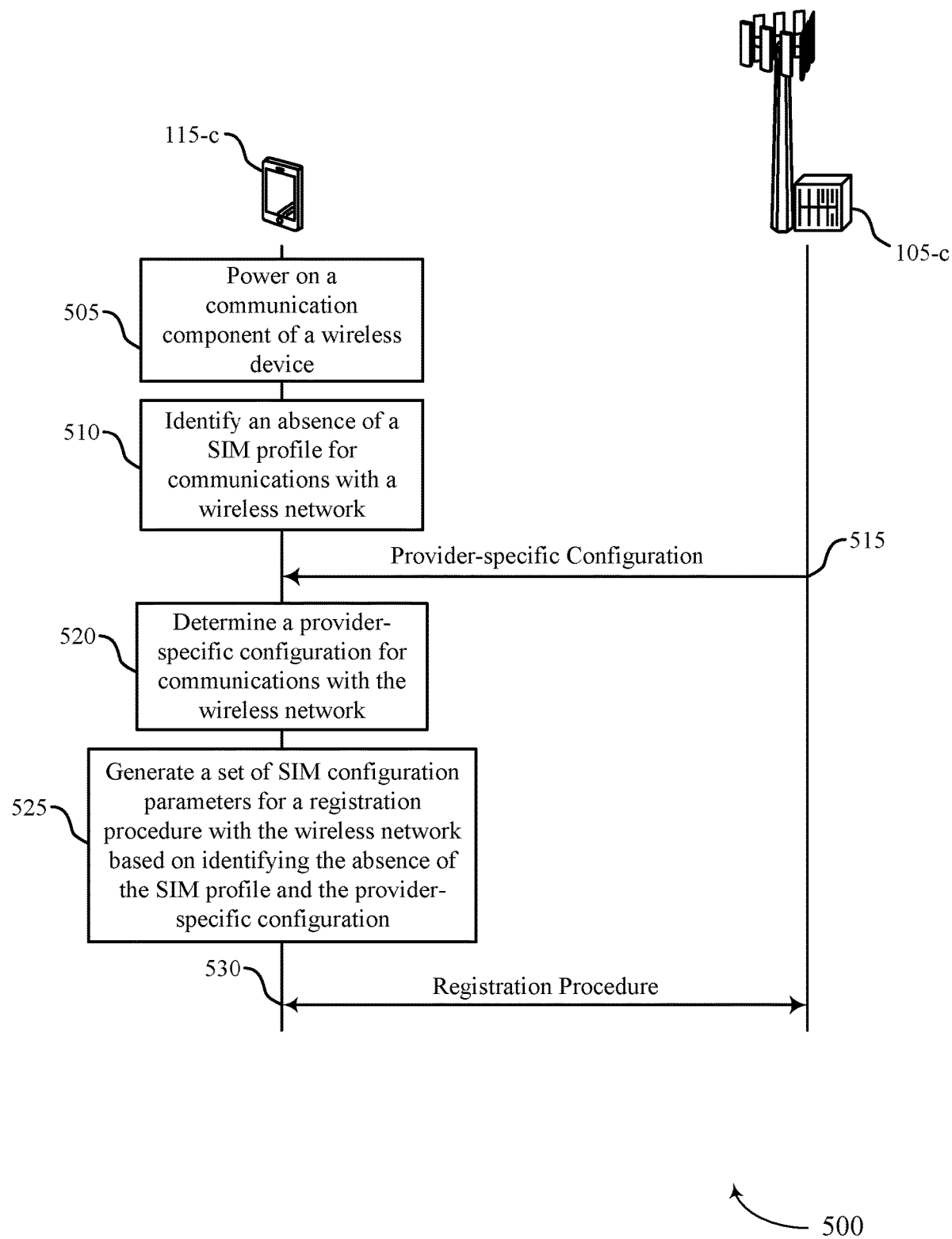
FIG. 5 illustrates an example of a process flow that supports a modem-assisted network attach procedure without a default SIM profile in accordance with aspects of the present disclosure.

FIG. 5 illustrates an example of a process flow 500 that supports a modem-assisted network attach procedure without a default SIM profile in accordance with aspects of the present disclosure. In some examples, the process flow 500 may implement aspects of the wireless communications system 100, the wireless communications system 200, and the wireless communications system 300, as described with reference to FIGS. 1, 2, and 3, respectively. The process flow 500 shows an example of an access procedure in which a UE 115-*c* may use a network key to attach to a wireless network, for example, via a base station 105-*c*, which may each be examples of the corresponding devices as described herein.

At 505, the UE 115-*c* may power on one or more communication components of the UE 115-*c*. The communication components may include, for example, one or more radios, one or more transmit and/or receive chains (including, e.g., various radio frequency (RF) and/or digital components) connected to a modem, and the like.

At 510, the UE 115-*c* may identify an absence of a SIM profile for communications with a wireless network. In some cases, the UE 115-*c* may be configured with a software capability to identify, for example, upon powering on the one or more communication components at 505, the absence of the SIM profile for communications with the wireless network.

At 515, the base station 105-*c* may transmit to the UE 115-*c*, and the UE 115-*c* may receive from the base station 105-*c*, signaling that may include an indication of one or more parameters of a provider-specific configuration. In some cases, the indication of the one or more parameters of the provider-specific configuration may be preconfigured for the UE 115-*c* and may be based on one or more master files, dedicated files, and/or elementary files preconfigured for the UE 115-*c*. In some cases, the indication of the one or more parameters of the provider-specific configuration preconfigured for the UE 115-c may be based on an integrated circuit card identifier for the UE 115-c.

At 520, the UE 115-c may determine the provider-specific configuration for communications with the wireless network. In some cases, the UE 115-c may determine the provider-specific configuration according to the indication of the one or more parameters of the provider-specific configuration, for example, received from the base station 105-c at 515.

At 525, the UE 115-c may generate a set of SIM configuration parameters for a registration procedure with the wireless network based on identifying the absence of the SIM profile and the provider-specific configuration. In some cases, the UE 115-c may locate a data file stored in memory of the UE 115-c containing the set of SIM configuration parameters, and the UE 115-c may generate set of SIM configuration parameters according to the data file. In some cases, the UE 115-c may cache the set of SIM configuration parameters in a buffer, and the UE 115-c may perform the registration procedure using the cached set of SIM configuration parameters. In some cases, the set of SIM configuration parameters may include one or more of a subscriber identifier, administrative data, an access control class, location area information, a location update status, a temporary subscriber identity, a globally unique temporary identifier, a last visited network and tracking area, an attach/detach completion status, a hash function to be used for a security context, a SIM service table, and the like.

In some cases, the UE 115-c may also generate a globally unique temporary identifier based on the SIM configuration parameters, where a registration procedure may be performed using the globally unique temporary identifier. In some cases, the globally unique temporary identifier may include an MME identifier and/or a temporary subscriber identifier.

At 535, the UE 115-c may perform the registration procedure with the wireless network, for example, via the base station 105-c, using the set of SIM configuration parameters, as the UE 115-c may have generated at 525. In some cases, UE 115-c may perform the registration procedure according to a set of service capabilities, where the set of service capabilities may be based on the set of SIM configuration parameters.

Figure 6:
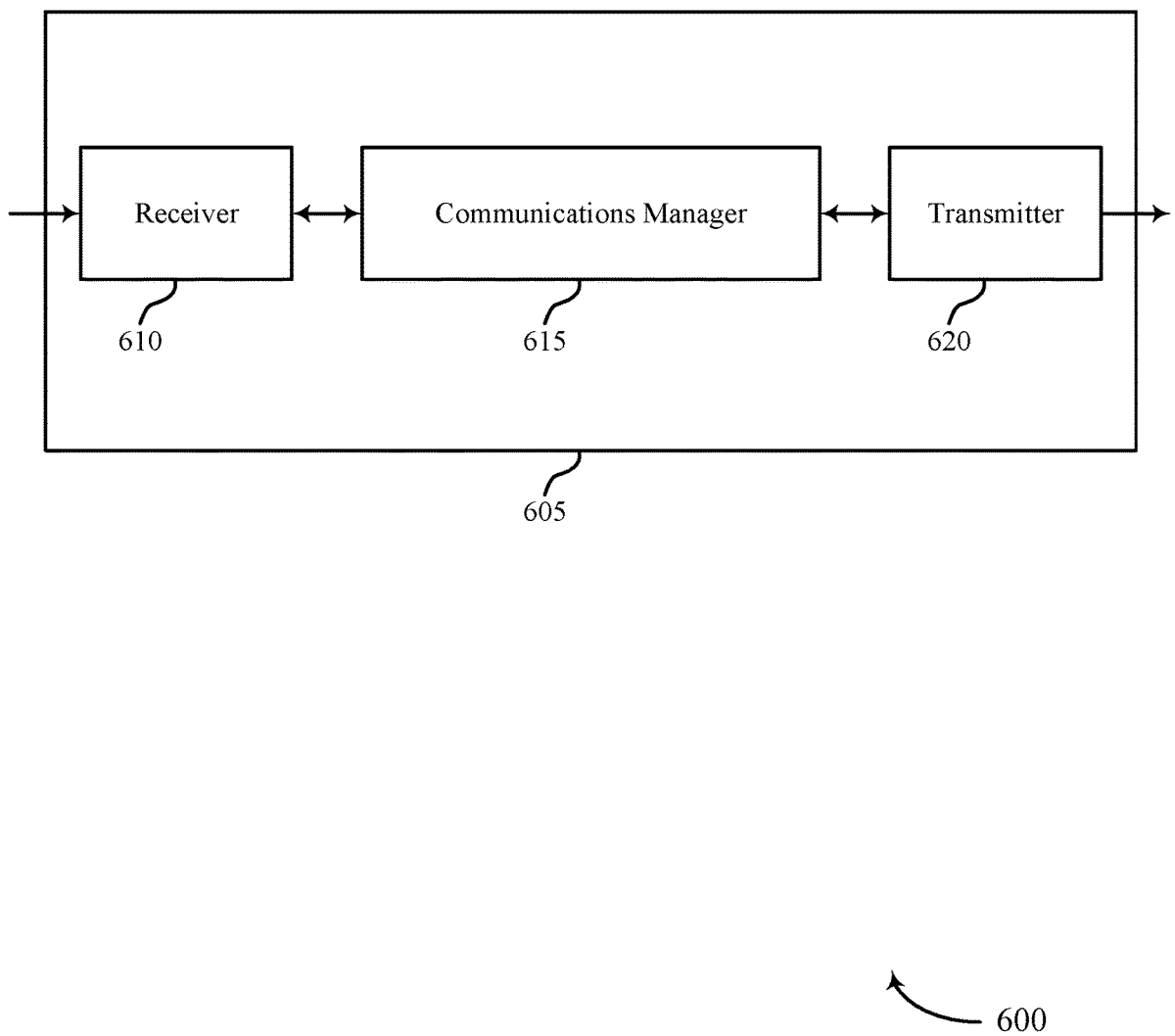
FIGS. 6 and 7 show block diagrams of devices that support modem-assisted network attach procedure without a default SIM profile in accordance with aspects of the present disclosure.

FIG. 6 shows a block diagram 600 of a device 605 that supports a modem-assisted network attach procedure without a default SIM profile in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to modem-assisted network attach procedure without a default SIM profile, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may power on a communication component of a wireless device, such as the device 605, identify an absence of a SIM profile for communications with a wireless network, determine a provider-specific configuration for communications with the wireless network, generate a set of SIM configuration parameters for a registration procedure with the wireless network based on identifying the absence of the SIM profile and the provider-specific configuration, and perform the registration procedure with the wireless network using the set of SIM configuration parameters. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
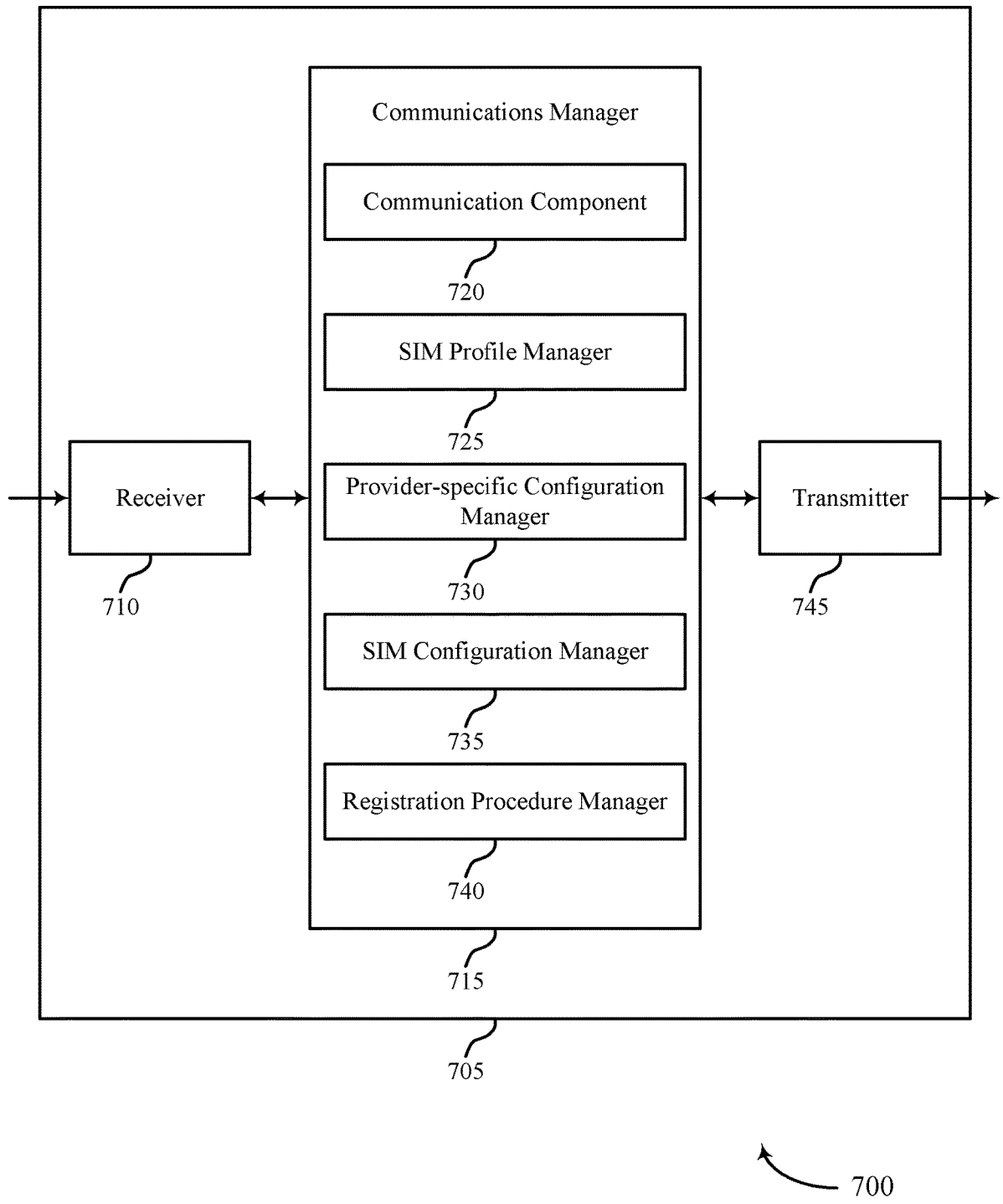

FIG. 7 shows a block diagram 700 of a device 705 that supports a modem-assisted network attach procedure without a default SIM profile in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to modem-assisted network attach procedure without a default SIM profile, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a communication component 720, a SIM profile manager 725, a provider-specific configuration manager 730, a SIM configuration manager 735, and a registration procedure manager 740. The communications manager 715 may be an example of aspects of the communications manager 910 described herein.

The communication component 720 may power on a communication component of a wireless device, such as the device 705.

The SIM profile manager 725 may identify an absence of a SIM profile for communications with a wireless network.

The provider-specific configuration manager 730 may determine a provider-specific configuration for communications with the wireless network.

The SIM configuration manager 735 may generate a set of SIM configuration parameters for a registration procedure with the wireless network based on identifying the absence of the SIM profile and the provider-specific configuration.

The registration procedure manager 740 may perform the registration procedure with the wireless network using the set of SIM configuration parameters.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
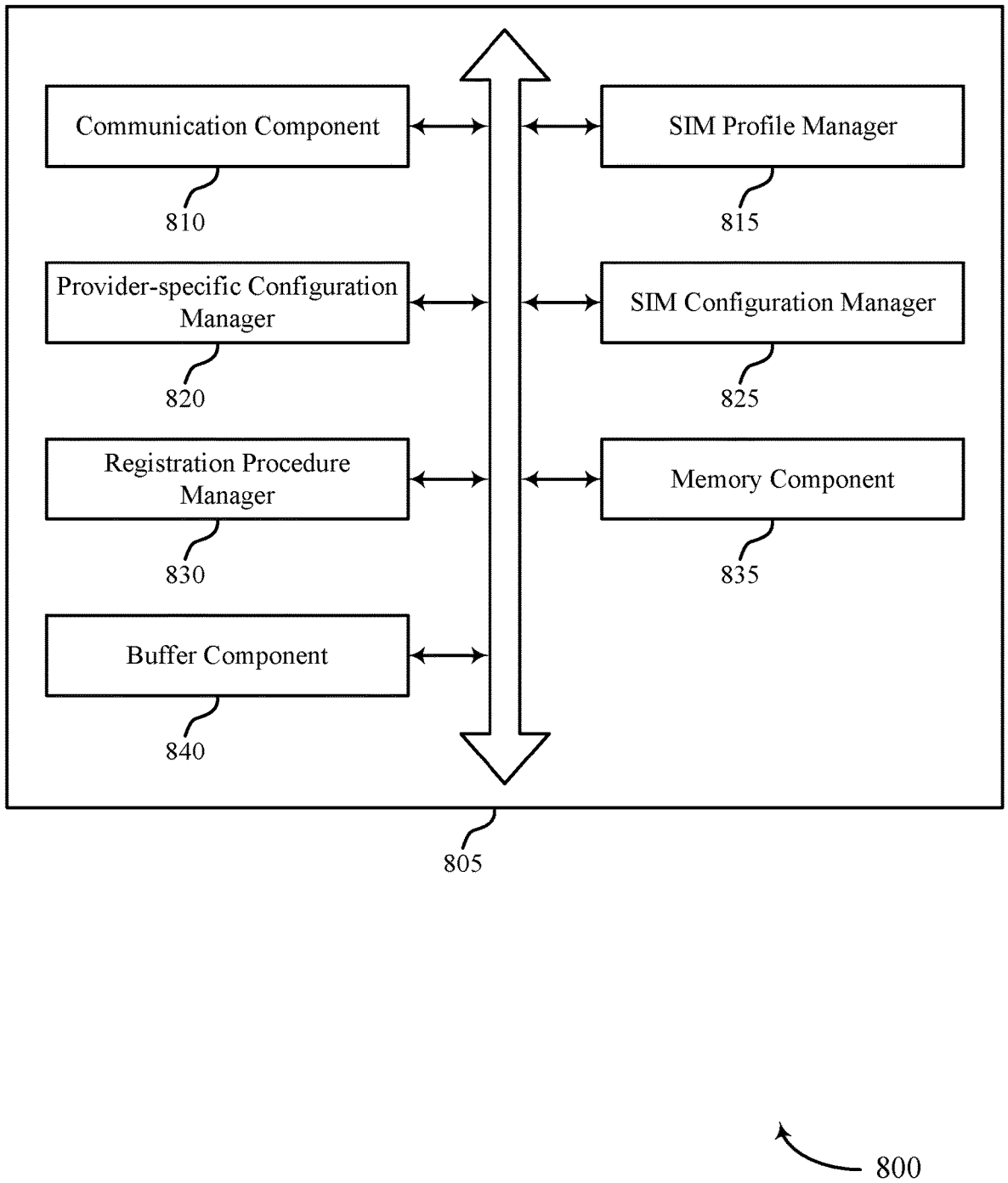
FIG. 8 shows a block diagram of a communications manager that supports a modem-assisted network attach procedure without a default SIM profile in accordance with aspects of the present disclosure.

FIG. 8 shows a block diagram 800 of a communications manager 805 that supports a modem-assisted network attach procedure without a default SIM profile in accordance with aspects of the present disclosure. The communications manager 805 may be an example of aspects of a communications manager 615, a communications manager 715, or a communications manager 910 described herein. The communications manager 805 may include a communication component 810, a SIM profile manager 815, a provider-specific configuration manager 820, a SIM configuration manager 825, a registration procedure manager 830, a memory component 835, and a buffer component 840. Each of these modules may communicate, directly or indirectly, with one another (e.g., via one or more buses).

The communication component 810 may power on a communication component of a wireless device. In some examples, powering on the communication component of the wireless device includes powering on a radio component for communications using a first type of radio access technologies.

The SIM profile manager 815 may identify an absence of a SIM profile for communications with a wireless network. In some cases, the wireless device is configured with a software capability to identify, upon powering on the communication component, the absence of the SIM profile for communications with the wireless network, the identifying based on the capability.

The provider-specific configuration manager 820 may determine a provider-specific configuration for communications with the wireless network.

In some examples, the provider-specific configuration manager 820 may receive signaling including an indication of one or more parameters of the provider-specific configuration, where the provider-specific configuration is determined based on the received indication. In some examples, the provider-specific configuration manager 820 may determine the provider-specific configuration based on the indication of one or more parameters of the provider-specific configuration preconfigured for the wireless device. In some cases, the indication of the one or more parameters of the provider-specific configuration preconfigured for the wireless device is based on one or more of master files, dedicated files, and elementary files preconfigured for the wireless device. In some cases, the indication of the one or more parameters of the provider-specific configuration preconfigured for the wireless device is based on an integrated circuit card identifier for the wireless device.

The SIM configuration manager 825 may generate a set of SIM configuration parameters for a registration procedure with the wireless network based on identifying the absence of the SIM profile and the provider-specific configuration. In some cases, the set of SIM configuration parameters includes subscriber identifier, administrative data, an access control class, location area information, a location update status, a temporary subscriber identity, a globally unique temporary identifier, a last visited network and tracking area, an attach/detach completion status, a hash function to be used for a security context, a SIM service table, or a combination thereof.

The registration procedure manager 830 may perform the registration procedure with the wireless network using the set of SIM configuration parameters. In some cases, the registration procedure is performed according to a set of service capabilities, the set of service capabilities based on the set of SIM configuration parameters.

In some examples, the registration procedure manager 830 may generate a globally unique temporary identifier based on the SIM configuration parameters, where the registration procedure is performed using the globally unique temporary identifier. In some cases, the globally unique temporary identifier includes an MME identifier and a temporary subscriber identifier.

The memory component 835 may locate a data file stored in memory of the wireless device containing the set of SIM configuration parameters, where the set of SIM configuration parameters is generated based on the data file.

The buffer component 840 may cache the set of SIM configuration parameters in a buffer of the wireless device, where the registration procedure is performed using the cached set of SIM configuration parameters.

Figure 9:
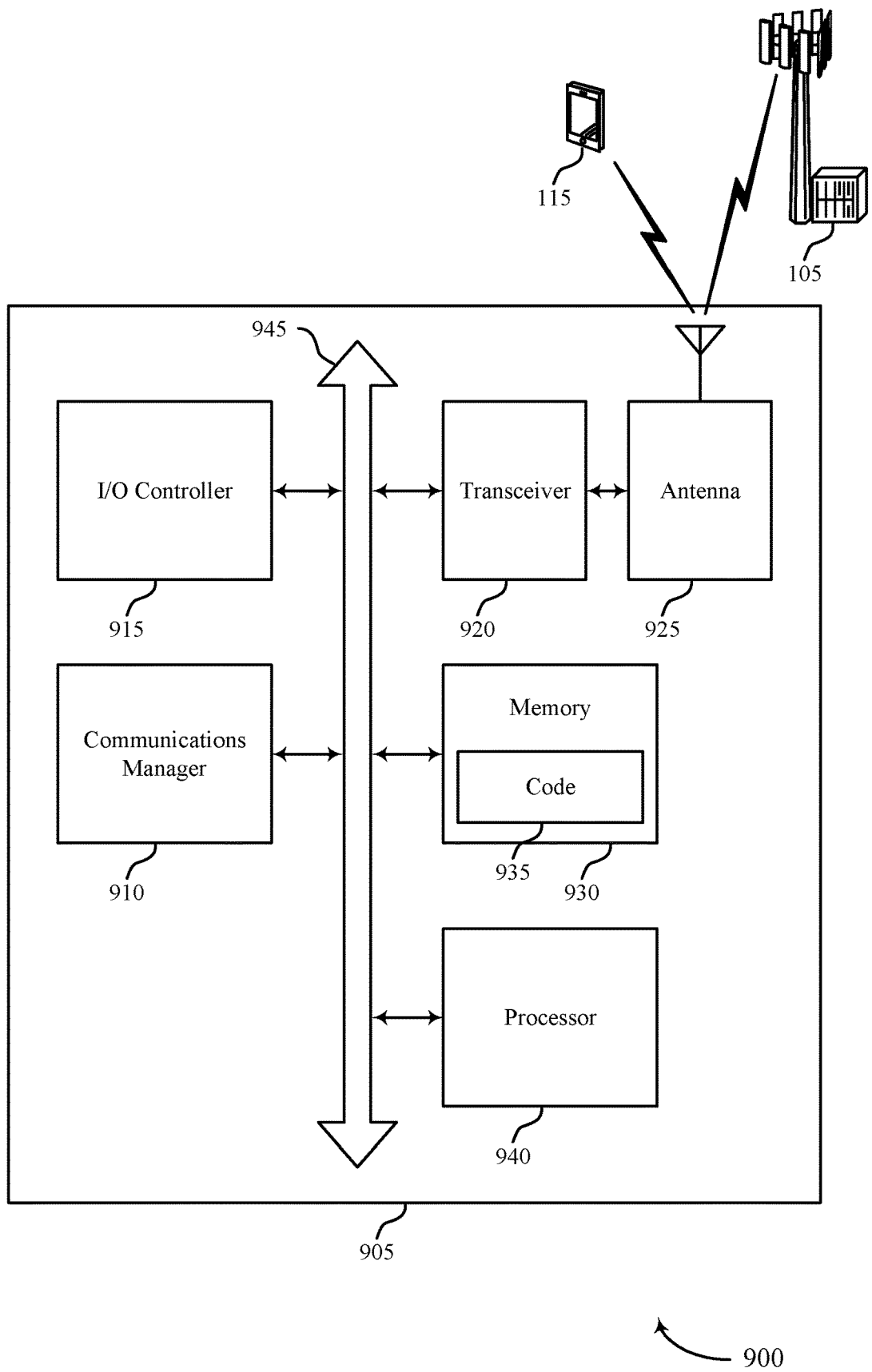
FIG. 9 shows a diagram of a system including a device that supports a modem-assisted network attach procedure without a default SIM profile in accordance with aspects of the present disclosure.

FIG. 9 shows a diagram of a system 900 including a device 905 that supports a modem-assisted network attach procedure without a default SIM profile in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may power on a communication component of a wireless device, such as the device 905, identify an absence of a SIM profile for communications with a wireless network, determine a provider-specific configuration for communications with the wireless network, generate a set of SIM configuration parameters for a registration procedure with the wireless network based on identifying the absence of the SIM profile and the provider-specific configuration, and perform the registration procedure with the wireless network using the set of SIM configuration parameters.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting modem-assisted network attach procedure without a default SIM profile).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
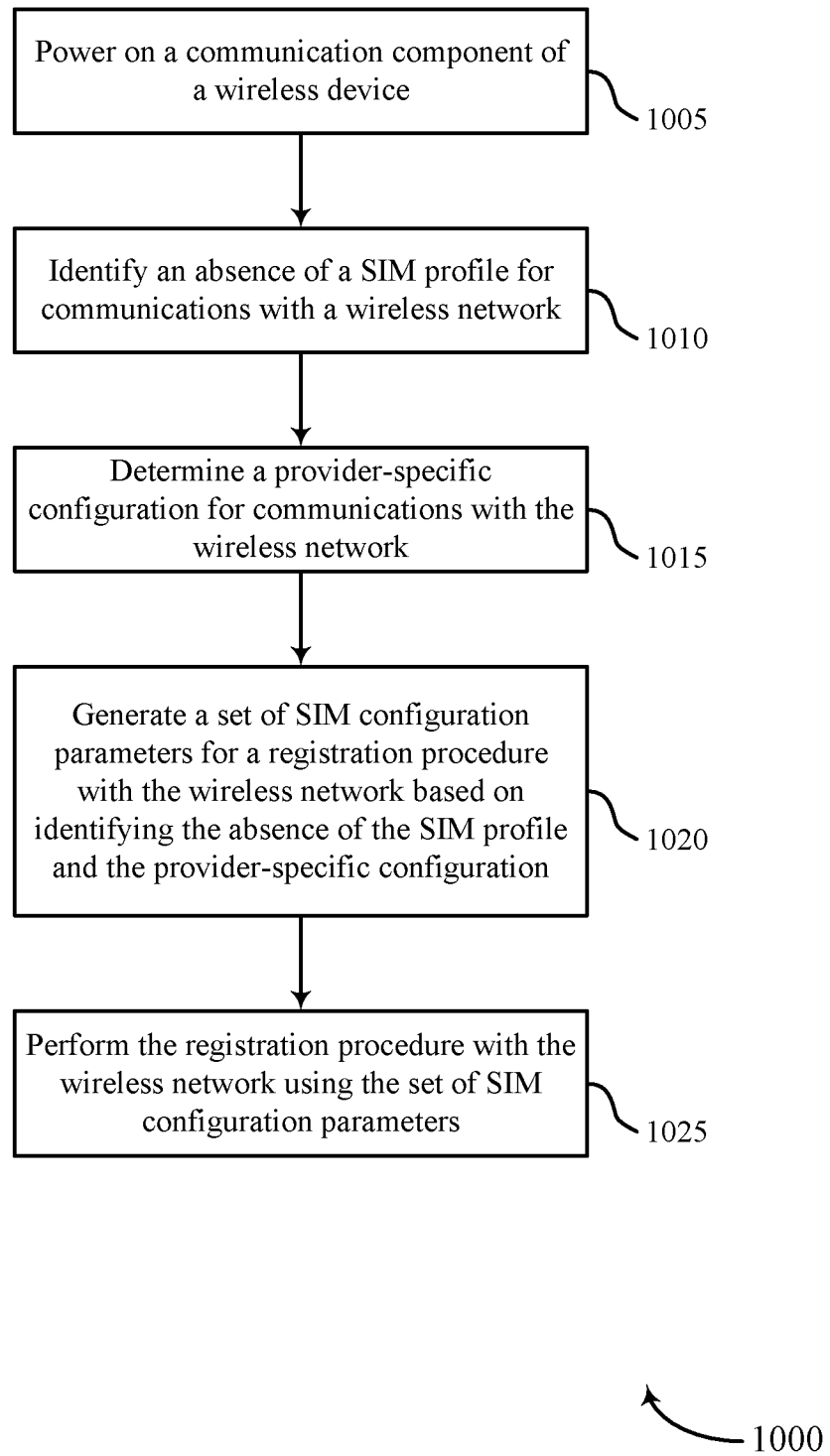
FIGS. 10 through 14 show flowcharts illustrating methods that support modem-assisted network attach procedure without a default SIM profile in accordance with aspects of the present disclosure.

FIG. 10 shows a flowchart illustrating a method 1000 that supports a modem-assisted network attach procedure without a default SIM profile in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may power on a communication component of a wireless device (e.g., of the UE). The operations of 1005 may be performed according to the methods described herein. In some examples, aspects of the operations of 1005 may be performed by a communication component as described with reference to FIGS. 6 through 9.

At 1010, the UE may identify an absence of a SIM profile for communications with a wireless network. The operations of 1010 may be performed according to the methods described herein. In some examples, aspects of the operations of 1010 may be performed by a SIM profile manager as described with reference to FIGS. 6 through 9.

At 1015, the UE may determine a provider-specific configuration for communications with the wireless network. The operations of 1015 may be performed according to the methods described herein. In some examples, aspects of the operations of 1015 may be performed by a provider-specific configuration manager as described with reference to FIGS. 6 through 9.

At 1020, the UE may generate a set of SIM configuration parameters for a registration procedure with the wireless network based on identifying the absence of the SIM profile and the provider-specific configuration. The operations of 1020 may be performed according to the methods described herein. In some examples, aspects of the operations of 1020 may be performed by a SIM configuration manager as described with reference to FIGS. 6 through 9.

At 1025, the UE may perform the registration procedure with the wireless network using the set of SIM configuration parameters. The operations of 1025 may be performed according to the methods described herein. In some examples, aspects of the operations of 1025 may be performed by a registration procedure manager as described with reference to FIGS. 6 through 9.

Figure 11:
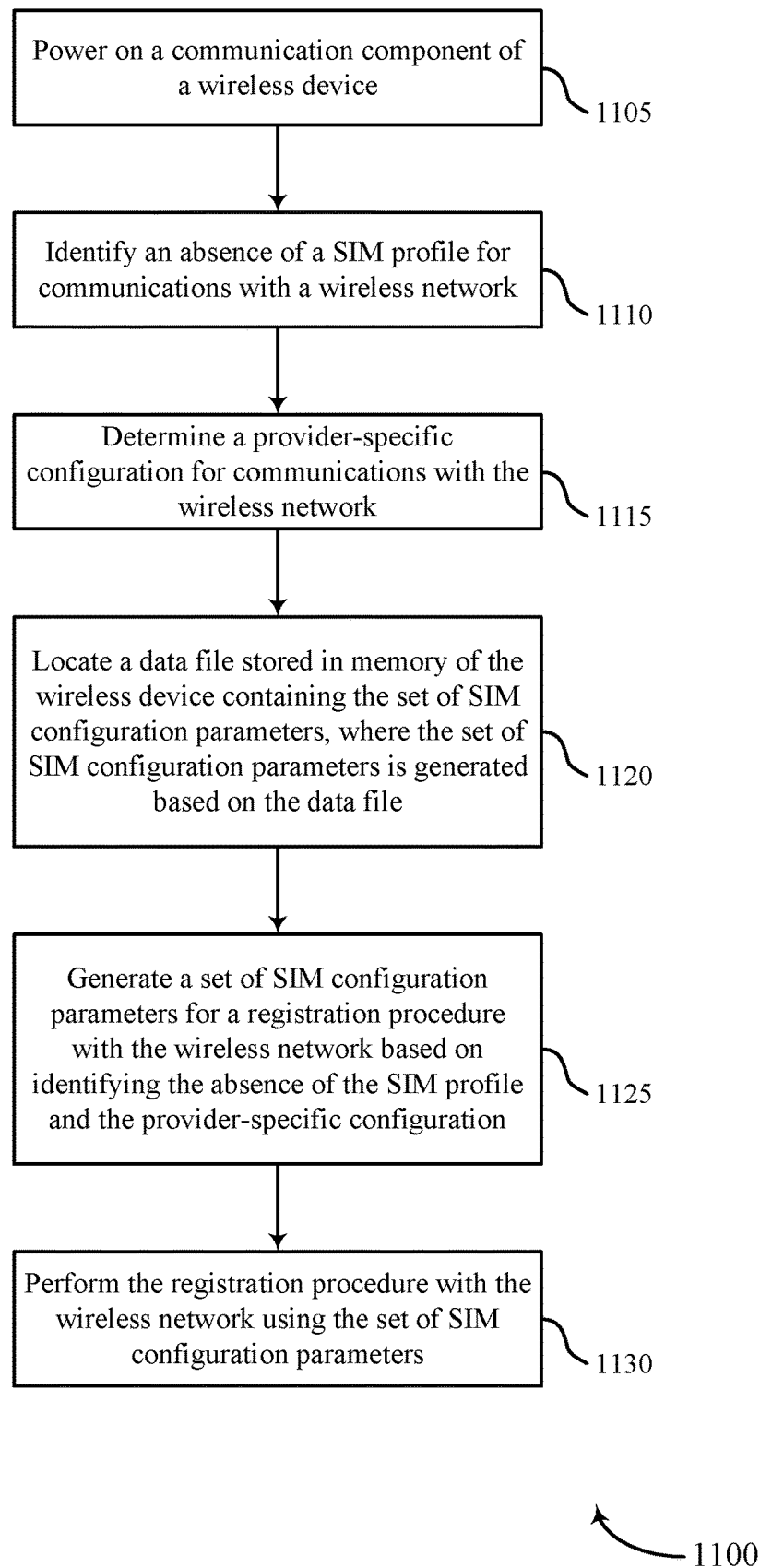

FIG. 11 shows a flowchart illustrating a method 1100 that supports a modem-assisted network attach procedure without a default SIM profile in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may power on a communication component of a wireless device (e.g., of the UE). The operations of 1105 may be performed according to the methods described herein. In some examples, aspects of the operations of 1105 may be performed by a communication component as described with reference to FIGS. 6 through 9.

At 1110, the UE may identify an absence of a SIM profile for communications with a wireless network. The operations of 1110 may be performed according to the methods described herein. In some examples, aspects of the operations of 1110 may be performed by a SIM profile manager as described with reference to FIGS. 6 through 9.

At 1115, the UE may determine a provider-specific configuration for communications with the wireless network. The operations of 1115 may be performed according to the methods described herein. In some examples, aspects of the operations of 1115 may be performed by a provider-specific configuration manager as described with reference to FIGS. 6 through 9.

At 1120, the UE may locate a data file stored in memory of the wireless device (e.g., of the UE) containing the set of SIM configuration parameters, where the set of SIM configuration parameters is generated based on the data file. The operations of 1120 may be performed according to the methods described herein. In some examples, aspects of the operations of 1120 may be performed by a memory component as described with reference to FIGS. 6 through 9.

At 1125, the UE may generate a set of SIM configuration parameters for a registration procedure with the wireless network based on identifying the absence of the SIM profile and the provider-specific configuration. The operations of 1125 may be performed according to the methods described herein. In some examples, aspects of the operations of 1125 may be performed by a SIM configuration manager as described with reference to FIGS. 6 through 9.

At 1130, the UE may perform the registration procedure with the wireless network using the set of SIM configuration parameters. The operations of 1130 may be performed according to the methods described herein. In some examples, aspects of the operations of 1130 may be performed by a registration procedure manager as described with reference to FIGS. 6 through 9.

Figure 12:
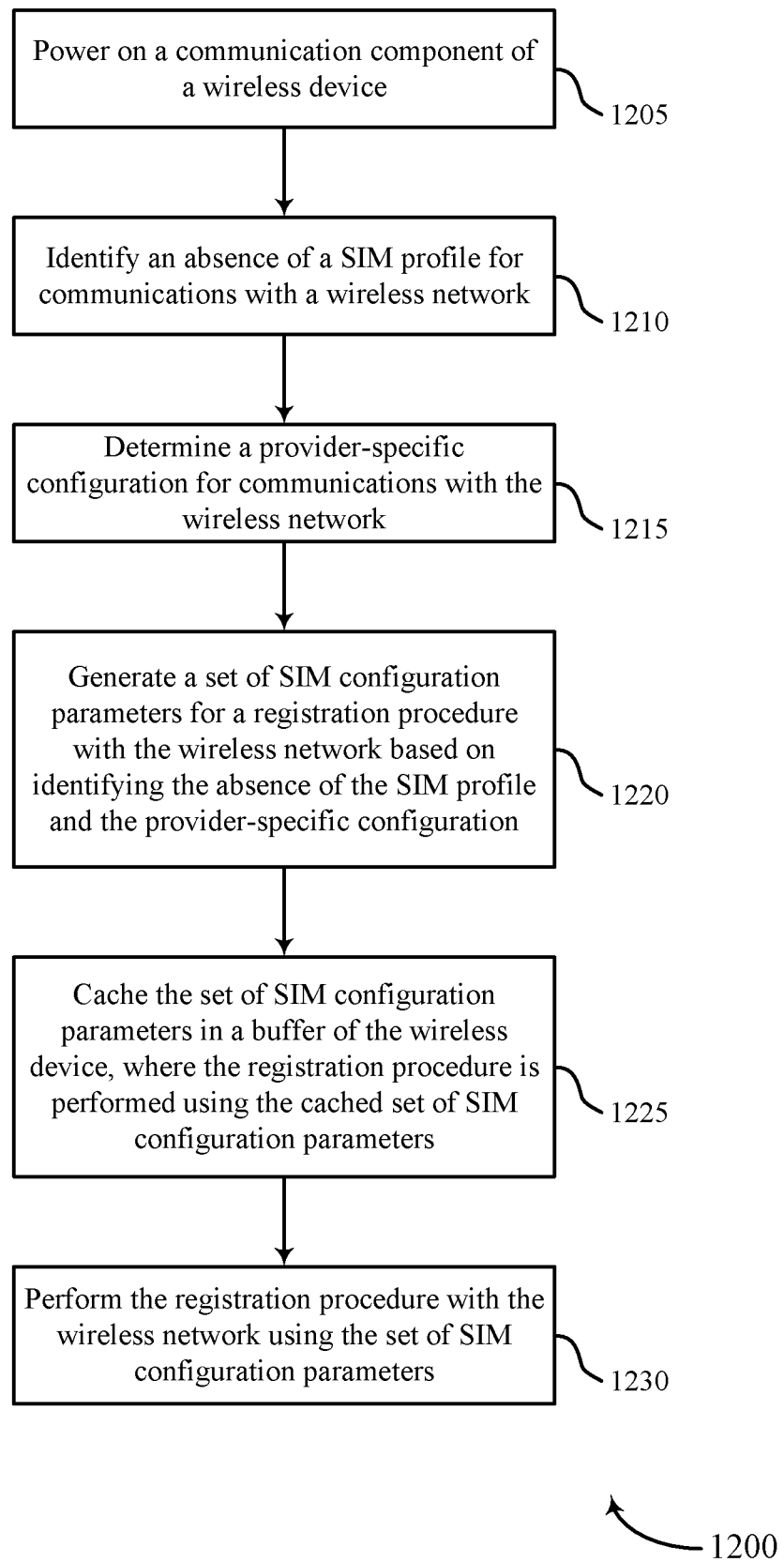

FIG. 12 shows a flowchart illustrating a method 1200 that supports a modem-assisted network attach procedure without a default SIM profile in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may power on a communication component of a wireless device (e.g., of the UE). The operations of 1205 may be performed according to the methods described herein. In some examples, aspects of the operations of 1205 may be performed by a communication component as described with reference to FIGS. 6 through 9.

At 1210, the UE may identify an absence of a SIM profile for communications with a wireless network. The operations of 1210 may be performed according to the methods described herein. In some examples, aspects of the operations of 1210 may be performed by a SIM profile manager as described with reference to FIGS. 6 through 9.

At 1215, the UE may determine a provider-specific configuration for communications with the wireless network. The operations of 1215 may be performed according to the methods described herein. In some examples, aspects of the operations of 1215 may be performed by a provider-specific configuration manager as described with reference to FIGS. 6 through 9.

At 1220, the UE may generate a set of SIM configuration parameters for a registration procedure with the wireless network based on identifying the absence of the SIM profile and the provider-specific configuration. The operations of 1220 may be performed according to the methods described herein. In some examples, aspects of the operations of 1220 may be performed by a SIM configuration manager as described with reference to FIGS. 6 through 9.

At 1225, the UE may cache the set of SIM configuration parameters in a buffer of the wireless device (e.g., of the UE), where the registration procedure is performed using the cached set of SIM configuration parameters. The operations of 1225 may be performed according to the methods described herein. In some examples, aspects of the operations of 1225 may be performed by a buffer component as described with reference to FIGS. 6 through 9.

At 1230, the UE may perform the registration procedure with the wireless network using the set of SIM configuration parameters. The operations of 1230 may be performed according to the methods described herein. In some examples, aspects of the operations of 1230 may be performed by a registration procedure manager as described with reference to FIGS. 6 through 9.

Figure 13:
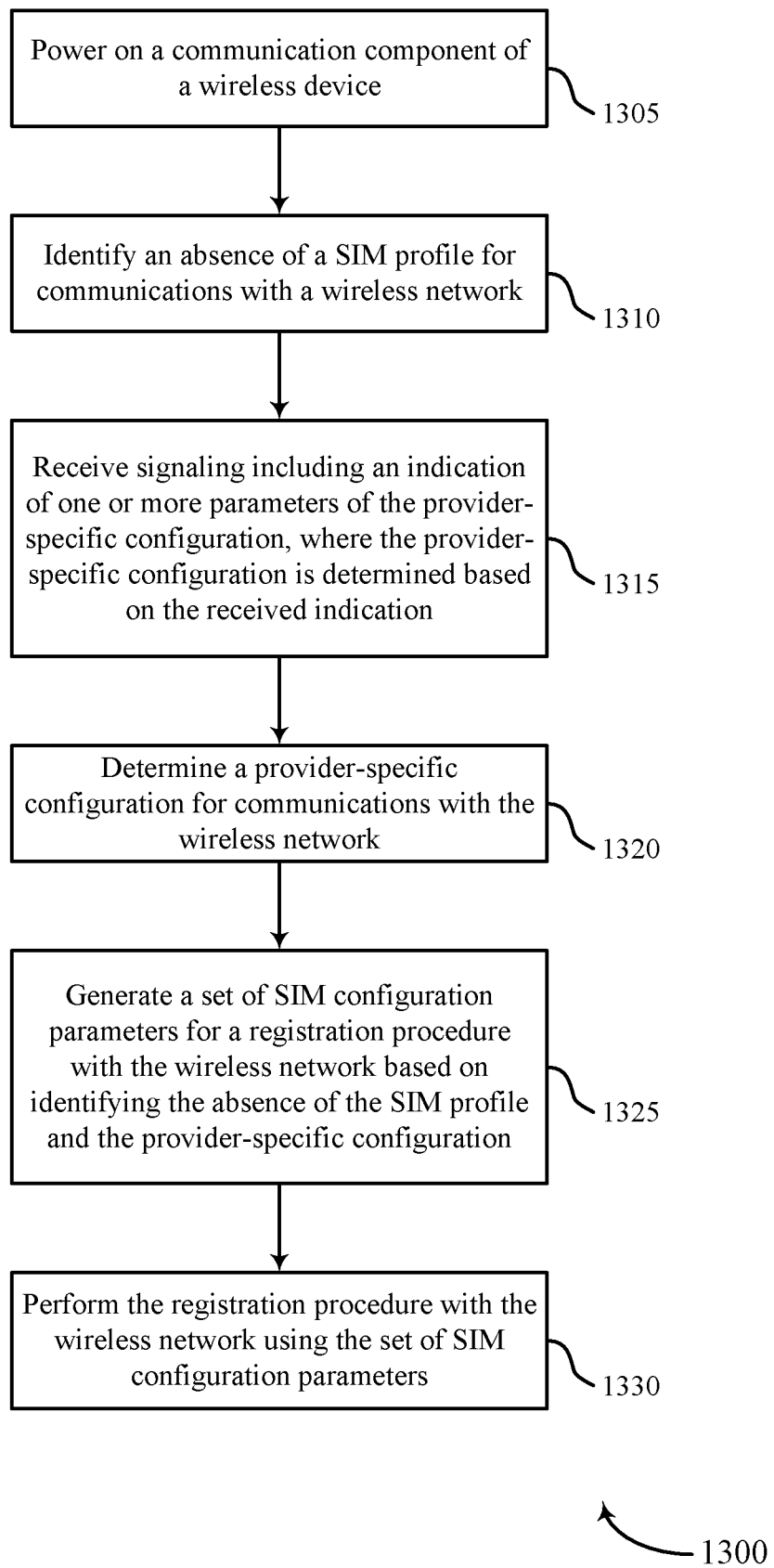

FIG. 13 shows a flowchart illustrating a method 1300 that supports a modem-assisted network attach procedure without a default SIM profile in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may power on a communication component of a wireless device (e.g., of the UE). The operations of 1305 may be performed according to the methods described herein. In some examples, aspects of the operations of 1305 may be performed by a communication component as described with reference to FIGS. 6 through 9.

At 1310, the UE may identify an absence of a SIM profile for communications with a wireless network. The operations of 1310 may be performed according to the methods described herein. In some examples, aspects of the operations of 1310 may be performed by a SIM profile manager as described with reference to FIGS. 6 through 9.

At 1315, the UE may receive signaling including an indication of one or more parameters of the provider-specific configuration, where the provider-specific configuration is determined based on the received indication. The operations of 1315 may be performed according to the methods described herein. In some examples, aspects of the operations of 1315 may be performed by a provider-specific configuration manager as described with reference to FIGS. 6 through 9.

At 1320, the UE may determine a provider-specific configuration for communications with the wireless network. The operations of 1320 may be performed according to the methods described herein. In some examples, aspects of the operations of 1320 may be performed by a provider-specific configuration manager as described with reference to FIGS. 6 through 9.

At 1325, the UE may generate a set of SIM configuration parameters for a registration procedure with the wireless network based on identifying the absence of the SIM profile and the provider-specific configuration. The operations of 1325 may be performed according to the methods described herein. In some examples, aspects of the operations of 1325 may be performed by a SIM configuration manager as described with reference to FIGS. 6 through 9.

At 1330, the UE may perform the registration procedure with the wireless network using the set of SIM configuration parameters. The operations of 1330 may be performed according to the methods described herein. In some examples, aspects of the operations of 1330 may be performed by a registration procedure manager as described with reference to FIGS. 6 through 9.

Figure 14:
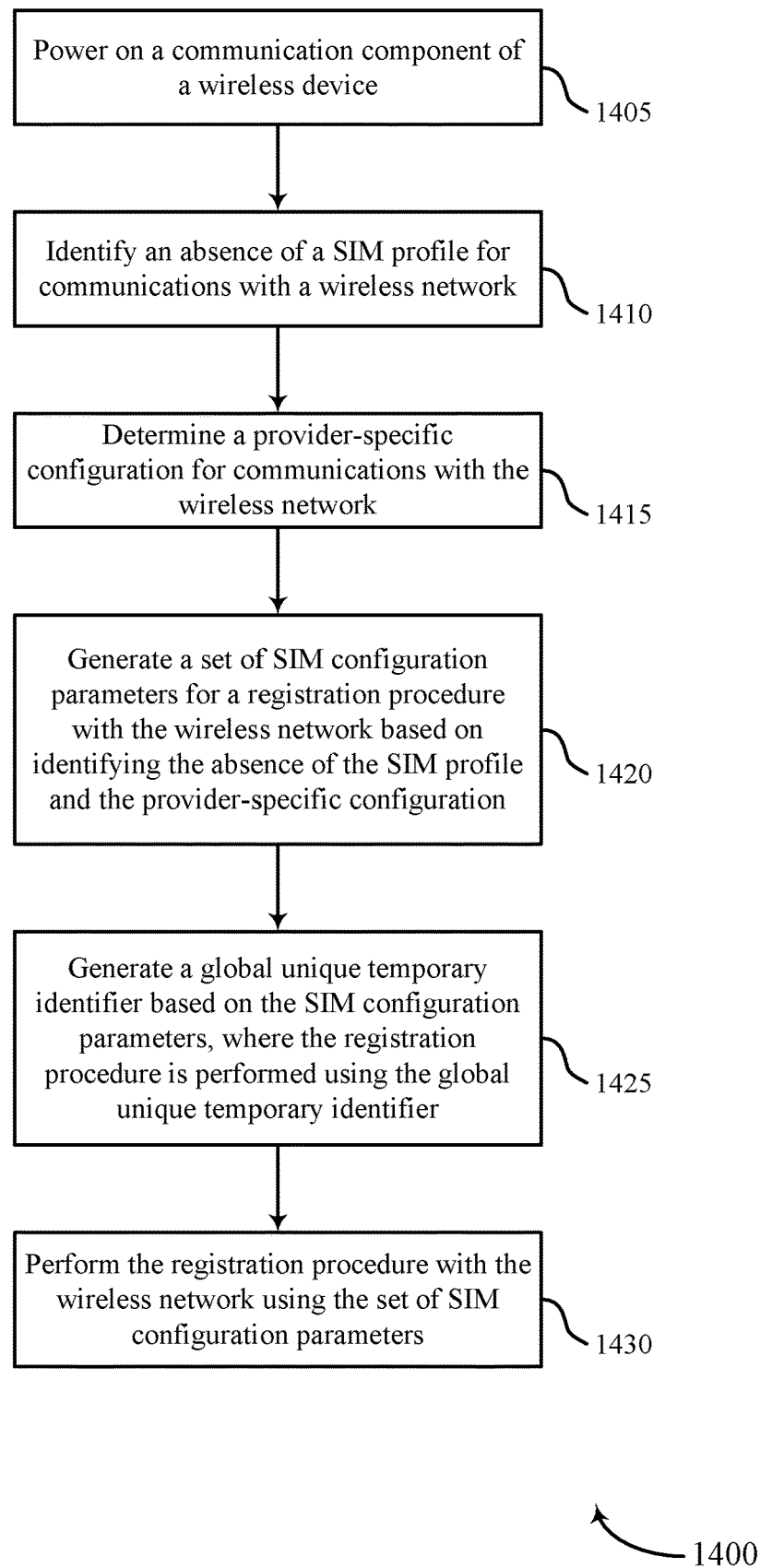

FIG. 14 shows a flowchart illustrating a method 1400 that supports a modem-assisted network attach procedure without a default SIM profile in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may power on a communication component of a wireless device (e.g., of the UE). The operations of 1405 may be performed according to the methods described herein. In some examples, aspects of the operations of 1405 may be performed by a communication component as described with reference to FIGS. 6 through 9.

At 1410, the UE may identify an absence of a SIM profile for communications with a wireless network. The operations of 1410 may be performed according to the methods described herein. In some examples, aspects of the operations of 1410 may be performed by a SIM profile manager as described with reference to FIGS. 6 through 9.

At 1415, the UE may determine a provider-specific configuration for communications with the wireless network. The operations of 1415 may be performed according to the methods described herein. In some examples, aspects of the operations of 1415 may be performed by a provider-specific configuration manager as described with reference to FIGS. 6 through 9.

At 1420, the UE may generate a set of SIM configuration parameters for a registration procedure with the wireless network based on identifying the absence of the SIM profile and the provider-specific configuration. The operations of 1420 may be performed according to the methods described herein. In some examples, aspects of the operations of 1420 may be performed by a SIM configuration manager as described with reference to FIGS. 6 through 9.

At 1425, the UE may generate a globally unique temporary identifier based on the SIM configuration parameters, where the registration procedure is performed using the globally unique temporary identifier. The operations of 1425 may be performed according to the methods described herein. In some examples, aspects of the operations of 1425 may be performed by a registration procedure manager as described with reference to FIGS. 6 through 9.

At 1430, the UE may perform the registration procedure with the wireless network using the set of SIM configuration parameters. The operations of 1430 may be performed according to the methods described herein. In some examples, aspects of the operations of 1430 may be performed by a registration procedure manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named 3GPP. CDMA2000 and UMB are described in documents from an organization named 3GPP2. The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a wireless device, comprising:
   powering on a communication component of the wireless device which is a user equipment (UE);
   identifying an absence of a subscriber identity module (SIM) profile for communications with a wireless network while the UE has a SIM card configured to connect the UE to the wireless network;
   determining a provider-specific configuration for communications with the wireless network;
   generating a set of SIM configuration parameters for a registration procedure with the wireless network based at least in part on identifying the absence of the SIM profile and the provider-specific configuration;
   generating a globally unique temporary identifier based at least in part on the SIM configuration parameters; and
   performing the registration procedure with the wireless network using the set of SIM configuration parameters and the globally unique temporary identifier.

2. The method of claim 1, further comprising:
   locating a data file stored in memory of the wireless device containing the set of SIM configuration parameters, wherein the set of SIM configuration parameters is generated based at least in part on the data file.

3. The method of claim 1, further comprising:
caching the set of SIM configuration parameters in a buffer of the wireless device, wherein the registration procedure is performed using the cached set of SIM configuration parameters.

4. The method of claim 1, further comprising:
receiving signaling comprising an indication of one or more parameters of the provider-specific configuration, wherein the provider-specific configuration is determined based at least in part on the received indication.

5. The method of claim 1, further comprising:
determining the provider-specific configuration based at least in part on an indication of one or more parameters of the provider-specific configuration preconfigured for the wireless device.

6. The method of claim 5, wherein the indication of the one or more parameters of the provider-specific configuration preconfigured for the wireless device is based at least in part on one or more of master files, dedicated files, and elementary files preconfigured for the wireless device.

7. The method of claim 5, wherein the indication of the one or more parameters of the provider-specific configuration preconfigured for the wireless device is based at least in part on an integrated circuit card identifier for the wireless device.

8. The method of claim 1, wherein the globally unique temporary identifier comprises a mobility management entity identifier and a temporary subscriber identifier.

9. The method of claim 1, wherein the set of SIM configuration parameters comprises a subscriber identifier, administrative data, an access control class, location area information, a location update status, a temporary subscriber identity, a globally unique temporary identifier, a last visited network and tracking area, an attach/detach completion status, a hash function to be used for a security context, a SIM service table, or a combination thereof.

10. The method of claim 1, wherein the registration procedure is performed according to a set of service capabilities, the set of service capabilities based at least in part on the set of SIM configuration parameters.

11. The method of claim 1, wherein the wireless device is configured with a software capability to identify, upon powering on the communication component, the absence of the SIM profile for communications with the wireless network, the identifying based at least in part on the capability.

12. The method of claim 1, wherein:
powering on the communication component of the wireless device comprises powering on a radio component for communications using a first type of radio access technologies.

13. An apparatus for wireless communications, comprising:
a processor,
memory in electronic communication with the processor; and
instructions stored in the memory and executable by the processor to cause the apparatus to:
power on a communication component of a wireless device;
identify an absence of a subscriber identity module (SIM) profile for communications with a wireless network while a SIM card is present at the apparatus configured to connect the apparatus to the wireless network;
determine a provider-specific configuration for communications with the wireless network;
generate a set of SIM configuration parameters for a registration procedure with the wireless network based at least in part on identifying the absence of the SIM profile and the provider-specific configuration;
generate a globally unique temporary identifier based at least in part on the SIM configuration parameters; and
perform the registration procedure with the wireless network using the set of SIM configuration parameters and the globally unique temporary identifier.

14. The apparatus of claim 13, wherein the instructions are further executable by the processor to cause the apparatus to:
locate a data file stored in memory of the wireless device containing the set of SIM configuration parameters, wherein the set of SIM configuration parameters is generated based at least in part on the data file.

15. The apparatus of claim 13, wherein the instructions are further executable by the processor to cause the apparatus to:
cache the set of SIM configuration parameters in a buffer of the wireless device, wherein the registration procedure is performed using the cached set of SIM configuration parameters.

16. The apparatus of claim 13, wherein the instructions are further executable by the processor to cause the apparatus to:
receive signaling comprising an indication of one or more parameters of the provider-specific configuration, wherein the provider-specific configuration is determined based at least in part on the received indication.

17. The apparatus of claim 13, wherein the instructions are further executable by the processor to cause the apparatus to:
determine the provider-specific configuration based at least in part on an indication of one or more parameters of the provider-specific configuration preconfigured for the wireless device.

18. The apparatus of claim 17, wherein the indication of the one or more parameters of the provider-specific configuration preconfigured for the wireless device is based at least in part on one or more of master files, dedicated files, and elementary files preconfigured for the wireless device.

19. The apparatus of claim 17, wherein the indication of the one or more parameters of the provider-specific configuration preconfigured for the wireless device is based at least in part on an integrated circuit card identifier for the wireless device.

20. The apparatus of claim 13, wherein the globally unique temporary identifier comprises a mobility management entity identifier and a temporary subscriber identifier.

21. The apparatus of claim 13, wherein the set of SIM configuration parameters comprises a subscriber identifier, administrative data, an access control class, location area information, a location update status, a temporary subscriber identity, a globally unique temporary identifier, a last visited network and tracking area, an attach/detach completion status, a hash function to be used for a security context, a SIM service table, or a combination thereof.

22. The apparatus of claim 13, wherein the registration procedure is performed according to a set of service capabilities, the set of service capabilities based at least in part on the set of SIM configuration parameters.

23. The apparatus of claim 13, wherein the wireless device is configured with a software capability to identify, upon powering on the communication component, the absence of the SIM profile for communications with the wireless network, the identifying based at least in part on the capability.

24. The apparatus of claim 13, wherein the instructions to power on the communication component of the wireless device are executable by the processor to cause the apparatus to power on a radio component for communications using a first type of radio access technologies.

25. An apparatus for wireless communications, comprising:
means for powering on a communication component of a wireless device;
means for identifying an absence of a subscriber identity module (SIM) profile for communications with a wireless network while a SIM card is present at the apparatus configured to connect the apparatus to the wireless network;
means for determining a provider-specific configuration for communications with the wireless network;
means for generating a set of SIM configuration parameters for a registration procedure with the wireless network based at least in part on identifying the absence of the SIM profile and the provider-specific configuration;
means for generating a globally unique temporary identifier based at least in part on the SIM configuration parameters; and
means for performing the registration procedure with the wireless network using the set of SIM configuration parameters and the globally unique temporary identifier.

26. The apparatus of claim 25, further comprising:
means for locating a data file stored in memory of the wireless device containing the set of SIM configuration parameters, wherein the set of SIM configuration parameters is generated based at least in part on the data file.

27. The apparatus of claim 25, further comprising:
means for receiving signaling comprising an indication of one or more parameters of the provider-specific configuration, wherein the provider-specific configuration is determined based at least in part on the received indication.

28. A non-transitory computer-readable medium storing code for wireless communications at a user equipment (UE), the code comprising instructions executable by a processor to:
power on a communication component of a wireless device;
identify an absence of a subscriber identity module (SIM) profile for communications with a wireless network while a SIM card is present at the UE configured to connect the UE to the wireless network;
determine a provider-specific configuration for communications with the wireless network;
generate a set of SIM configuration parameters for a registration procedure with the wireless network based at least in part on identifying the absence of the SIM profile and the provider-specific configuration;
generate a globally unique temporary identifier based at least in part on the SIM configuration parameters; and
perform the registration procedure with the wireless network using the set of SIM configuration parameters and the globally unique temporary identifier.

* * * * *